US007062452B1

(12) United States Patent
Lotvin et al.

(10) Patent No.: US 7,062,452 B1
(45) Date of Patent: Jun. 13, 2006

(54) METHODS AND SYSTEMS FOR ELECTRONIC TRANSACTIONS

(76) Inventors: Mikhail Lotvin, P.O. Box 660, New York, NY (US) 10021; Richard M. Nemes, 2231 56th Dr., Brooklyn, NY (US) 11234-6840

( * ) Notice: Subject to any disclaimer, the term of this patent is extended or adjusted under 35 U.S.C. 154(b) by 829 days.

(21) Appl. No.: 09/653,085

(22) Filed: Aug. 31, 2000

Related U.S. Application Data

(60) Provisional application No. 60/202,908, filed on May 10, 2000.

(51) Int. Cl.
 *G06F 17/60* (2006.01)
(52) U.S. Cl. ...................................................... 705/26
(58) Field of Classification Search ................ 705/26, 705/27
 See application file for complete search history.

(56) References Cited

U.S. PATENT DOCUMENTS

| 5,210,853 | A | * | 5/1993 | Nakasuji et al. ................ 707/1 |
| 5,749,785 | A | * | 5/1998 | Rossides ....................... 463/25 |
| 5,877,759 | A | * | 3/1999 | Bauer .......................... 719/317 |
| 6,304,864 | B1 | * | 10/2001 | Liddy et al. ................... 706/15 |
| 6,381,597 | B1 | * | 4/2002 | Lin .............................. 707/4 |
| 6,522,875 | B1 | * | 2/2003 | Dowling et al. .......... 455/414.3 |
| 2002/0147674 | A1 | * | 10/2002 | Gillman ........................ 705/37 |

FOREIGN PATENT DOCUMENTS

| JP | 2003-284120 | * | 3/2003 |

OTHER PUBLICATIONS

"Intelligent Agents: A primer" Feldman, Susan, et al. Oct. 1999. Searcher.*
"Future Calling" Pournelle, Jerry. Dec. 13, 1999. Tele.com.*
"Mobile Technology: Looking ahead" hager, Jon. Dec. 1999. IBM Syssy.*
"The Role of Human Web assistants in e-commerce: an analysis and a usability study" Aber, Johan, et al. 2000. Internet Research.*
"Writing intelligent Web agents" Schrenk, Michael. Mar. 2000. Web Techniques.*
Smith et al. "The Role of Shared Ontology in XML-Based Trading Architectures", Ontology.org, 1999. Retrieved from http://www.ontology.org/main/papers/cacm-agents99.html on Aug. 8, 2004.*

(Continued)

*Primary Examiner*—Jeffrey A. Smith
*Assistant Examiner*—Naeem Haq

(57) ABSTRACT

In the preferred computer system, the user is provided with a separate Internet-accessible entity referred to here as the "personal page." A personal page, preferably, includes memory for storing information related to the user. For example, on his/her personal page the user indicates what he/she wishes to purchase, possibly along with other criteria associated with the purchase, such as, for example, a time that the purchase should take The user is provided with the ability to create personalized bidding rules that vendors that offer goods and services must respect. Vendors have the ability to specify similar criteria, which describe the goods and/or services they offer. Vendors can indicate, for example, the prices of their goods, times and places that their services are available, etc. Preferably, these specifications, called "vendor scripts," are embodied in active software/data entities (agents) that traverse sites on the Internet visiting sites hosting users' personal pages. Thus, preferably, vendor software/data agents (comprising vendor scripts) are the mobile, active elements in the system and purchasing requirements are stationary and more passive in comparison.

6 Claims, 28 Drawing Sheets

OTHER PUBLICATIONS

Charles Petrie, "Agent-Based Software Engineering", Standford Networking Research Center, Feb. 21, 2000. Retrieved from http://www.etse.urv.es/recerca/banzai/toni/MAS/Docs/abse.html on Jul. 21, 2004.*

Martin L. Griss, "My Agent Will Call Your Agent . . . But Will It Respond", Software Technology Laboratory, HP Laboratories Palo Alto, Dec., 1999.*

No Author, "FIPA 97 Specification, Version 2.0, Part 2, Agent Communication Language", Foundation For Intelligent Agents, 1998.*

Hui-Min Chen, "Design and Implementation of the Agent-based EVMs System", Jun. 30, 2000. Retrieved from http://metadata.sims.berkeley.edu/Metadata_archive_april2001/agentrp.html on Jun. 17, 2004.*

U.S. Appl. No. 60/194,535.*

* cited by examiner

```
feasible_list = empty;        // priority queue; cost(a,b) is priority for (i ranging over items in its designated categories)

if (i satisfies slot 1 constraints)

for (j ranging over items in its designated categories)

if (j satisfies slot 2 contraints)

if ( (i,j) satisfies global contraints)

if feasible_list not full insert (i,j) and cost(i,j) into feasible_list;

else if ( cost(i,j) < cost(tail) )

{ delete tail from feasible_list;
                        insert (i,j) and cost(i,j) into feasible_list;

} return (feasible_list);
```

FIG. 16C

{ ACCEPT_BR || ACCEPT_VENDOR_SCRIPT || MATCHMAKER
|| SERVICE_ACTIVATION_LIST || SERVICE_SCRIPT_LIST }

FIG. 20

METHODS AND SYSTEMS FOR ELECTRONIC TRANSACTIONS

The application claims the benefit of Provisional Application No. 60/202,908, filed May 10, 2000.

BACKGROUND OF THE INVENTION

In traditional e-commerce, a user electronically attaches to a vendor's Internet Web site to make purchases. This most widely-used model is essentially an electronic catalog, in which goods and/or services are listed by vendors and purchasers actively peruse. Operators of these sites invest millions of dollars in advertising and brand building in order to encourage users to visit their sites, thereby increasing the costs of products since advertising costs must be passed on.

In traditional e-commerce, the user has limited power since he/she is forced by the structure of the marketplace to transact business with a specific site. There are, however, sites that "look for" the best deal. Here, the user has more flexibility and is more empowered, but still is at the mercy of the site doing the searching. There is still a manual element involved. Furthermore, the user may have to attach to another site to transact the purchase.

Another e-commerce technique is essentially a reverse auction, in which the user indicates a desired price and providers of goods and services vie to meet the price. Yet another model allows a user to requests an item on a web site and the site sends the request to vendors in order to obtain the desired product. Bidding on Internet sites is also well known, e.g., eBay.com. Also, some sites allow users to design a customized view (i.e., a Web page) of the site. Further, there are business-to-business sites where businesses buy and sell products and services. There are other e-commerce techniques (including business-to-business) as known in the art. What all these methods have in common is that they do not provide sufficient autonomy to users, who must visit sites to make purchases. In current electronic business, the user is not sufficiently empowered in the electronic world known as the Internet.

SUMMARY OF THE INVENTION

This invention applies to both commercial and consumer applications of computer technology. Thus, users of the described system can be either consumers purchasing goods and/or services for personal use or commercial enterprises obtaining business-related goods and/or services. (In some embodiments, the term "user" can refer to a human being and/or a machine, such as a computer. In some embodiments "user" can refer to a corporation or other group of human beings. Similarly, the term "vendor" can refer to a human being or corporation or other group of human beings, and/or a computer or set of computers.)

In the preferred system, the user is provided with a separate Internet-accessible entity referred to here as the "personal page." A personal page, preferably, includes memory for storing information related to its user. For example, on his/her personal page, the user indicates what he/she wishes to purchase, possibly along with other criteria associated with the purchase, such as, for example, a time that the purchase should take place. (In some implementations the personal page can be used to specify what the user wants to sell.) For example, a consumer wishing to purchase a service, such as a haircut, could indicate that he/she wishes to obtain the services of a barber at a particular time on a particular date, or more generally within a particular time interval over a succession of dates ("Between 3 pm and 5 pm Monday Or Wednesday next week"). Other criteria might include the place that the goods or services are to be delivered, for example. The user is provided with the ability to create personalized bidding rules that vendors that offer goods and services (collectively known as "items" for sale) must respect. For example, the user may indicate that he/she will accept the lowest price received within an hour, day, etc. Similarly, the user can also say that he/she will not accept a price that is greater than a specified amount, and/or the desired item should be delivered no later than a given date/time.

A user's purchasing or buying requirements ("B.R.") are stored on his/her personal page. The meaning of B.R. (purchasing/buying requirements) is not limited to purchasing or buying, and may relate to other requirements stored in connection with a personal page, for example, requests for service, information, advertisement, as well as other data.

Vendors have the ability to specify similar criteria, which describe the goods and/or services they offer. Vendors can indicate, for example, the prices of their goods, times and places that their services are available, etc. Vendors, preferably, do not have personal pages on which the specification is done. Preferably, these specifications, called "vendor scripts," are embodied in active software/data entities (agents) that traverse sites on the Internet visiting sites hosting users' personal pages. Thus, preferably, vendor software/data agents (comprising vendor scripts) are the mobile, active elements in the system and personal pages are stationary and more passive in comparison. Alternatively, vendor scripts may be stored on a personal page associated with a vendor. Also, alternatively, a personal page may contain both B.R.'s and vendor scripts. Though B.R.'s (vendor scripts) are preferably translated to lower level language equivalents and then stored on personal pages (vendor sites), we will continue to refer to the translated equivalents as B.R.'s (vendor scripts) for simplicity. Users and vendors are preferably given the capability of entering, editing, deleting, activating, deactivating, and reactivating B.R.'s and vendor scripts using techniques known in the art.

In the preferred embodiment, vendors of various items send electronic representatives (software agents, in the form of a script in an appropriate scripting language, for example) that visit personal pages. This electronic representative includes sufficient information to interface with the user's B.R. on the personal page so as to complete transactions if a compatible match is found. (Also, if permitted by the user, electronic representatives of the vendors may suggest alternative products.) In this implementation, instead of forcing a user to purchase items at vendors' sites, as is now mostly the case, the vendors "come" to the user and bid in accordance with the user's bidding rules.

BRIEF DESCRIPTION OF THE DRAWINGS

FIG. 16C illustrates pseudocode of the two-slot example shown in FIGS. 16A and B;

FIG. 20 illustrates computer processes that are concurrently executed to match B.R.'s and vendor scripts;

DETAILED DESCRIPTION OF THE PREFERRED EMBODIMENT

A personal page can be hosted by an Internet server. It may also be hosted by the user's local computer, and, in some embodiments, can be made visible to the Internet similar to the way napster.com makes files residing on a user's local hard drive accessible to other users of the Internet. In yet other embodiments, it may be hosted by a computer or computers that are electronically positioned in the network between the user's local computer and an Internet server. In other embodiments, the personal page can be hosted on a computer or computers other than the user's local computer and mirrored on his/her local computer, i.e., the two copies are synchronized and kept current with each other. In other embodiments, the user's local computer hosts the personal page and another computer(s) contains a mirrored copy.

Figure 1A:
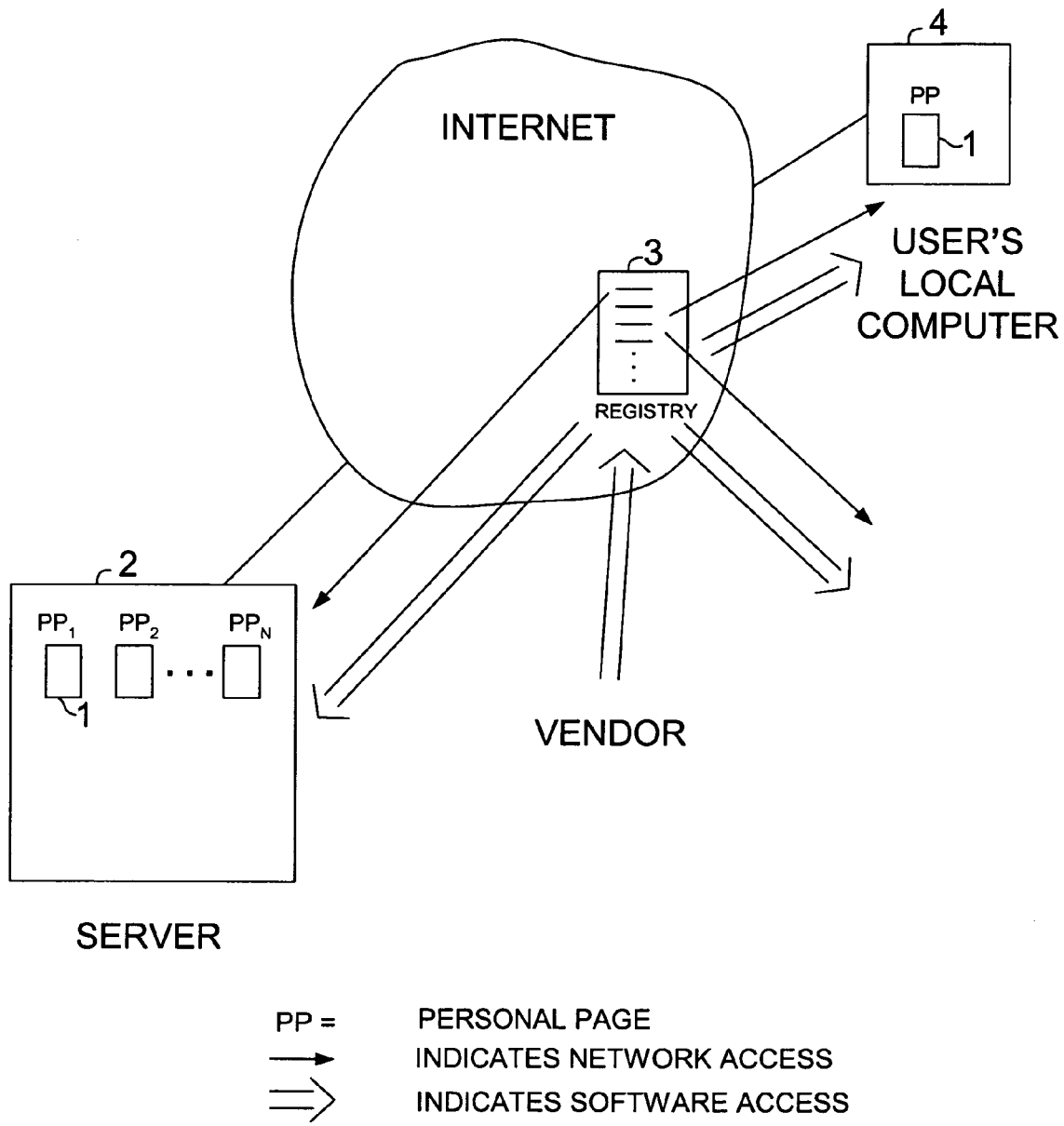
FIG. 1A illustrates the overall architecture of one preferred embodiment.

FIG. 1A illustrates the overall architecture of one preferred embodiment. In this preferred embodiment the personal pages, e.g. 1, are hosted on one or more Internet servers, e.g., 2. There are also, preferably, one or more sites that contain the network addresses of sites hosting personal pages. See 3. Based on this information, vendor scripts and B.R.'s are brought together to determine compatibility. The determination of compatibility can be done at the site hosting the personal page, at the vendor's site, or at another computer accessible to both. As noted, personal pages may also be hosted at users' local computers. The address information of such computers is also stored in central location(s) accessible over the Internet. (See, e.g., 3. Several levels of addressing also can be employed). A local user computer hosting a personal page is illustrated as 4. A local computer can be a PC, another Internet appliance, or a larger machine.

In a preferred embodiment, a personal page is comprised of computer memory, which, for example, stores B.R's. In this embodiment, a personal page has associated with it software as described below. This can include databases, executable code, libraries, application processes, and other such software known in the art for realizing Internet applications.

Figure 1B:
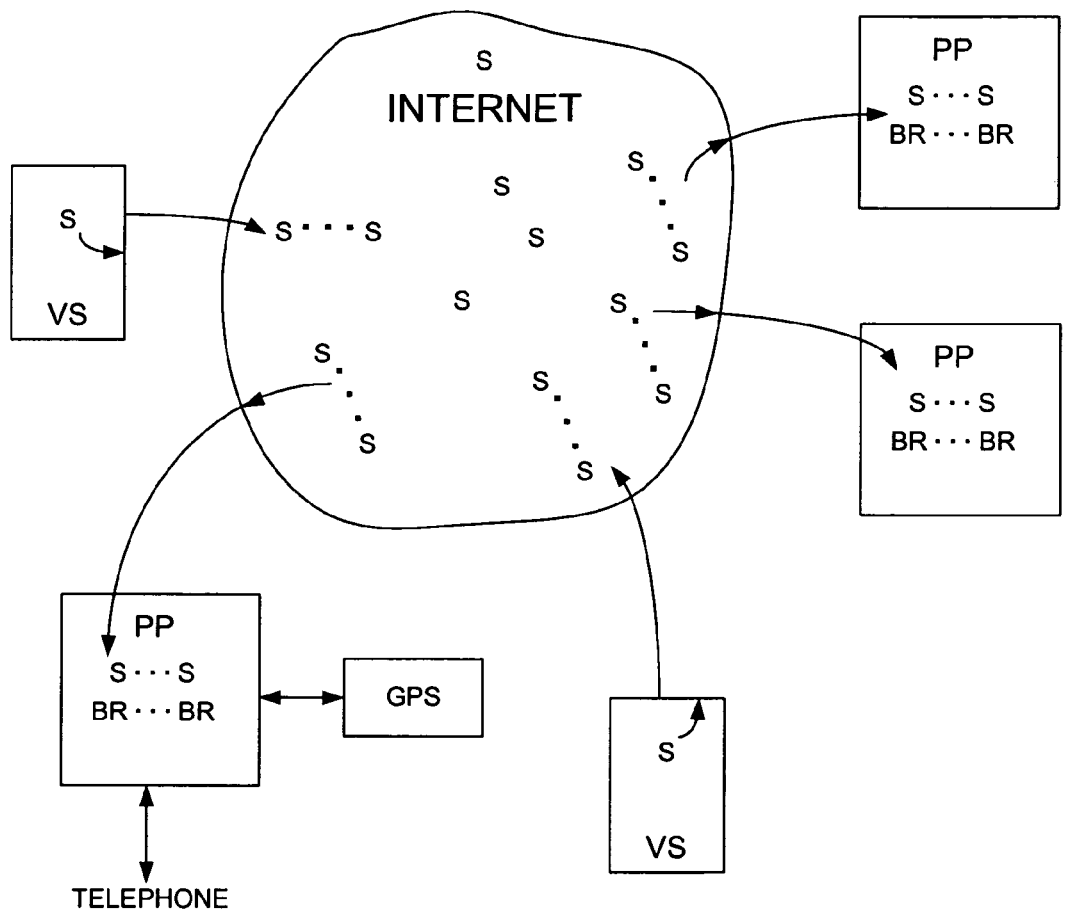
FIG. 1B illustrates the overall preferred organization where the B.R.'s are stationary and the vendor scripts are mobile components.
Figure 2:
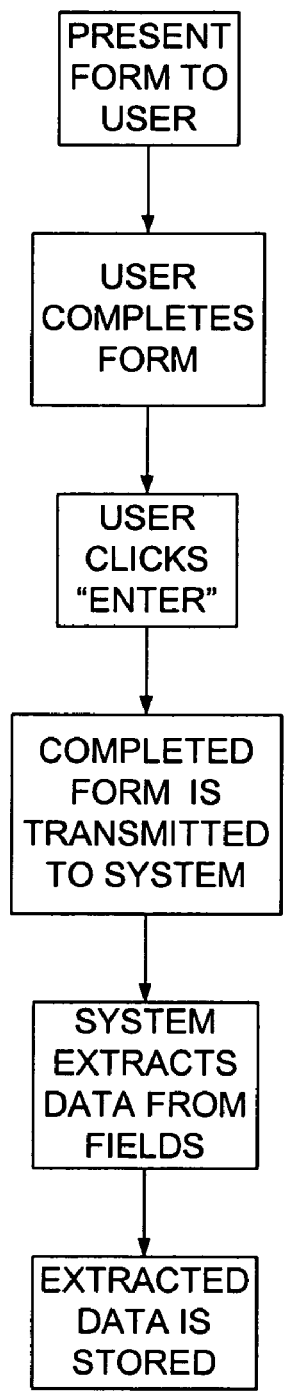
FIG. 2 illustrates computer steps of entering requirements (B.R.'s) and vendor scripts using electronic input forms.

FIG. 1B illustrates the overall preferred organization where the personal pages ("pp") hosting B.R.'s are stationary and the vendor scripts illustrated as "s" are mobile components. Preferably, the requirements (B.R.'s) and vendor scripts are created by users using fixed length electronic input forms, preferably in the form of Web pages, presented to the user at his/her local computer as is known in the art. The user completes the form and, when complete, clicks a button, preferably called "enter" or "send." The system then processes the form, extracting the information in the fields, and stores the B.R or vendor script thus created. Preferably B.R.'s are stored in connection with a personal page. See FIG. 2. (In other embodiments, the B.R.'s and/or vendor scripts can be entered using variable length forms. In other embodiments, the B.R.'s and/or vendor scripts are stored by the system in their raw form, without conversion to another internal form.) Preferably, the processed information, extracted from the forms entered for B.R.'s and vendor scripts, are stored in data structures, akin to C "struct's" or Pascal "records," called "purchase forms" and "vendor forms," respectively. (As noted, these are not limited to sale of items and may relate to other information.) The B.R.'s and vendor scripts can also be created using voice input whereby the user is prompted for information that he/she speaks into a microphone connected to the local computer or into a telephone, as is known in the art. Using voice recognition techniques known in the art, the information is gathered and stored in a purchase form (or vendor form in the case of a vendor). User-dependent voice recognition software may be associated with a personal page.

Figure 3:
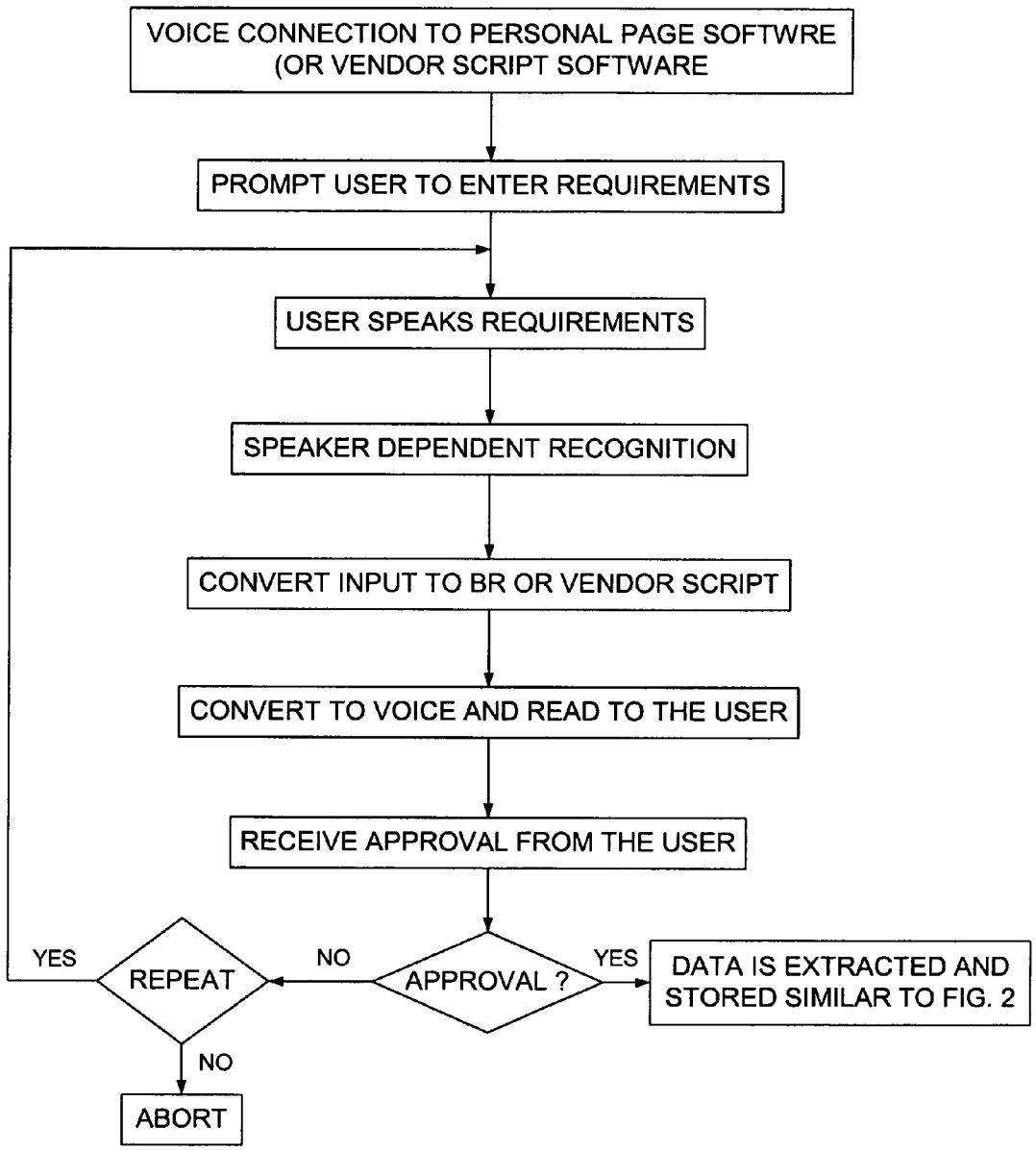
FIG. 3 illustrates the steps associated with voice input of B.R.'s (vendor scripts)

FIG. 3 illustrates the steps associated with voice input of B.R.'s (vendor scripts). Graphical techniques known in the art, including but not limited to GUI, can be used to gather the information from the user wishing to input a B.R. or vendor script. Some of the graphical techniques that can be used include the user picking icons from a menu or list, which are then pieced together to compose the data constituting a B.R. or vendor script. In general, various techniques known in the art for obtaining information from a user can be used.

The Web page form presented to the user for the purpose of creating a B.R. (and similarly vendor script) is preferably a fixed length electronic form, as mentioned above, with fixed, labeled attributes. (Attributes are fields, like the "attribute" notion in the Relational Data Base Model.) Attributes are assigned values input by the user, or NULL, which may appear as a blank to the user if he/she does not enter a value. Optionally, some of the attributes may have values assigned to them by the user clicking a button near the field, with the user then choosing from among a list of possible allowed values. Also, certain information not entered by the user may be assigned default values. Such techniques are know in the art.

In what follows, the purchase forms and their processing are described, with vendor forms handled in a similar way. The user is required to provide values for certain attributes, such as "Action," and techniques for enforcing that he/she do so are well known in the art. Action (e.g., "purchase", "sell," "trade," "license," "reserve," "rent," "lease," etc.), Item Name, Item code, UPC code, Date (of delivery), Place, Supplier, Quantity, Quality, Size, and Price are examples of attributes in a purchase form, but in alternate embodiments purchase forms can contain other attributes as well and may omit some or all that are shown here. Some attributes may be automatically assigned a default value. In some embodiments, some or all of these attributes can have optional qualifiers such as "maximum" (<=), "minimum" (>=), "earliest" (>=), "latest" (<=), etc., for example, specified with them. Examples include:

| Action: purchase | Item: airline ticket | Place: Hawaii | Date of Delivery: >= Jan. 1, 2001 |
| Action: reserve | Item: hotel room | Place: Hawaii | Price: <= $350/night |
| Action: purchase | Item: champagne | Place: Hawaii | Price: >= $40 |

In other embodiments, higher-level qualifiers such as, for example, the "between" comparison operator found in the SQL data base query language can also be supported. Each attribute has associated with it a "domain," which, like its identically named counterpart in the Relational Data Base Model, is the set of all possible values that the attribute may attain. A user may also specify how vendors should bid for items in a B.R. on a personal page, for example, at what time/date the deal should be completed, whether the criteria for acceptance is the lowest price, and the like.

Figure 4:
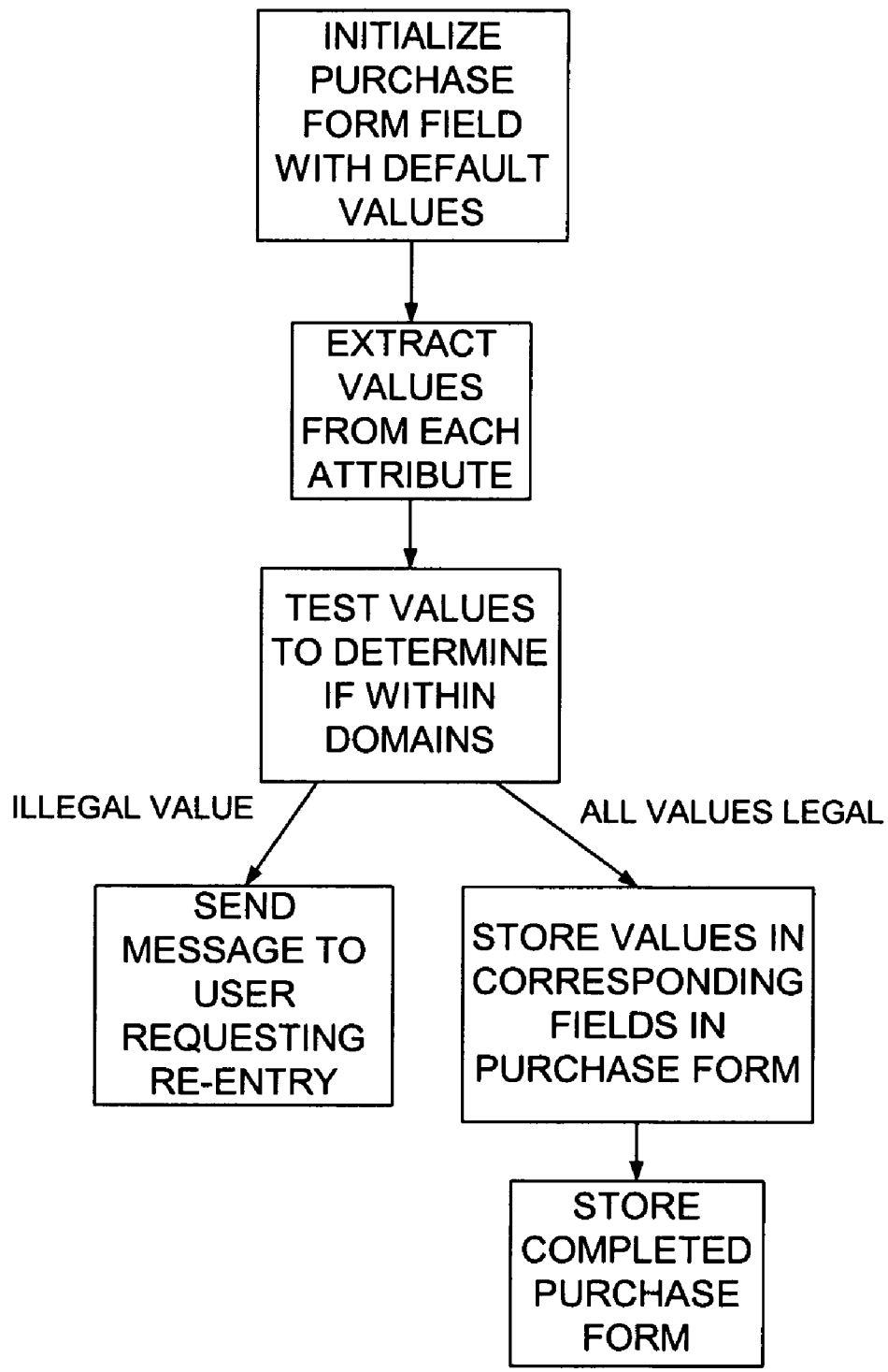
FIG. 4 illustrates the steps of creating a purchase (vendor) form.

The processing of the Web page input form completed by the user to create the purchase form (vendor form) involves the following. The system extracts the data from each attribute, checks that the value is in the domain of that attribute, and if so, stores the value in a corresponding field, with possible conversion, in the purchase form (vendor form). Illegal values cause the user to be sent the input form once again with a message indicating that an attribute value (or values) lie outside the defined domain(s). Once processing is complete, the purchase form (vendor form) is stored as the system's internal data structure used to represent the B.R. (vendor script). See FIG. 4. Preferably, purchase forms and vendor forms are the same length and have corresponding attributes. In other embodiments, they may have differing lengths and/or differing attributes.

A purchase form is "satisfied" against a vendor form if all its attribute values are compatible with associated attribute values in the vendor form. In the preferred embodiment, compatibility of attributes is aided by a compatibility dictionary maintained by the system. The compatibility dictionary is preferably a database and associated program logic that indicates whether two or more values in certain attributes are deemed compatible. For example, if the value for the Action attribute in a purchase form is "purchase" and the value for the Action attribute in a vendor form is "sell," then the dictionary would indicate that these actions are compatible. Action values "buy" and "sell" would similarly be deemed compatible values for Action in the dictionary. But "trade" and "license" would not be deemed compatible Actions, nor would "buy" and "buy." Similarly, the values "100" and "<1000" would be deemed compatible in all attributes, since 100 is less than 1000 universally, and "anytime next week" and "next Wednesday" would also be deemed compatible universally. But "100" and "<50" would be deemed incompatible as would "anytime next week" and "in 6 weeks." Geographical attribute values "outside New York Metropolitan area" and "Boston" would be deemed compatible, while "New York Metropolitan area" and "Taiwan" would be considered incompatible. Preferably, the value NULL is compatible with all values, except the special value NOT NULL. Techniques for dealing with NULL values are known in the art and can be found in Data Base Management Systems (DBMS's) that support the SQL Relational Data Base query language, for example. In other embodiments, instead of, or in addition to, NULL, there may be a special value DON'T_CARE that indicates that any value is acceptable to the user in that attribute. In other embodiments there may be a value PROMPT that causes the prompting of the user for a value at the time the system is attempting to satisfy the purchase form against the vendor form. In some embodiments, the value indicated may be a location on the user's computer (e.g., hard drive) or a location on a Web page at an Internet site at which the value is to be obtained by the system automatically. In general, various techniques known in the art for obtaining a value can be used. Other embodiments may have other special values as dictated by the needs of the users. In some embodiments, the user may be given the ability to define his/her own special values with their own special meaning, thus providing an element of programmability to the user.

The compatibility dictionary technique can be used as an intelligent high-level macro feature allowing users to indicate a set or sequence of items and/or actions shorthand. For example, the user may create a B.R. that reads in part Action: purchase Item: romantic vacation Place: Hawaii The compatibility dictionary, containing a macro-like definition of "romantic vacation," expands romantic vacation into, for example, the set "first class airline tickets, five-star hotel, flowers>$30, champagne . . . " Thus, the single purchase form above would generate a set of associated purchase forms

| Action: purchase | Item: airline ticket | Place: Hawaii | Quality: first class |
| Action: reserve | Item: hotel room | Place: Hawaii | Quality: five-star |
| Action: purchase | Item: flowers | Place: Hawaii | Price: >$30 |
| Action: purchase | Item: champagne | Place: Hawaii | Price: DON'T_CARE |

In some embodiments, the user may be given the ability to define his/her own special definitions of terms, which can override and/or extend definitions contained in the dictionary. Preferably, the user can query the dictionary for definitions contained within it. In some embodiments, the dictionary's contents can evolve automatically using techniques of Artificial Intelligence. For example, software that scans newspaper advertisements for vacations may automatically deduce the currently accepted understanding of "romantic vacation" and enter or modify the dictionary entry appropriately.

In some embodiments, the user may be given the means of controlling the compatibility dictionary used by the system in satisfying purchase forms against vendor forms. For example, the user may indicate to the system which compatibility dictionary to use if more than one is available. He/she may even have the ability to edit the dictionary, or create a customized personal one. There may be separate compatibility dictionaries for each language: one for English, another for Spanish, a third for Russian, etc. Using techniques of Artificial Intelligence, the system may evolve a compatibility dictionary that is the result of "learning" what a user (or users in general, or a class of users) consider compatible and incompatible. Compatibility dictionaries may be supported that are particular to one industry or one class of industries, or to a class of individuals. Using techniques of Artificial Intelligence, the user may be given the choice of "teaching" the system which values he/she considers compatible and incompatible. A group of users may collectively agree to use a particular dictionary or dictionaries in some embodiments, or they may agree to refrain from using a particular dictionary or dictionaries. In some embodiments, a B.R. and/or a vendor script may have associated with it, as indicated by the user, a designation of which compatibility dictionary or dictionaries are to be used and which ones are excluded from use in that particular instance.

In some embodiments, the user's B.R. (vendor script) Web page input form described above may contain optional attributes that allow the user to indicate Boolean conditions. This is similar to the advanced search features found on Internet search engine sites, e.g. hotbot.com, that allow the user to specify conditions required of pages that are returned by the search. For example, the form may contain a "condition" attribute that allows the user to specify a B.R. such as Action: purchase Item: airline ticket Place: Hawaii Condition: airline≠TWA.

Specifying and processing general boolean conditions are well known in the art and such known techniques may be used in various embodiments. The language for specifying conditions preferably includes the ability to express full Boolean logical expressions, as is known in the art. Thus, connectives such as, for example, AND, OR, and NOT are preferably available to the user, along with comparison operators, such as, for example, =, ≠, <, <=, >, >=, AT, BETWEEN, BEFORE, AFTER, etc. Preferably, wild characters, such as * for example, which are known in the art, are also included to allow the user the ability to compose more general conditions. The ability to compose "regular expressions," as is known in the art and found in systems such as the UNIX Operating System, for example, is preferably also included. Some embodiments may not choose to include regular expressions, however. Some embodiments may optionally include conditional AND (CAND) and/or conditional OR (COR) connectives, as is known in the art.

Figure 19:
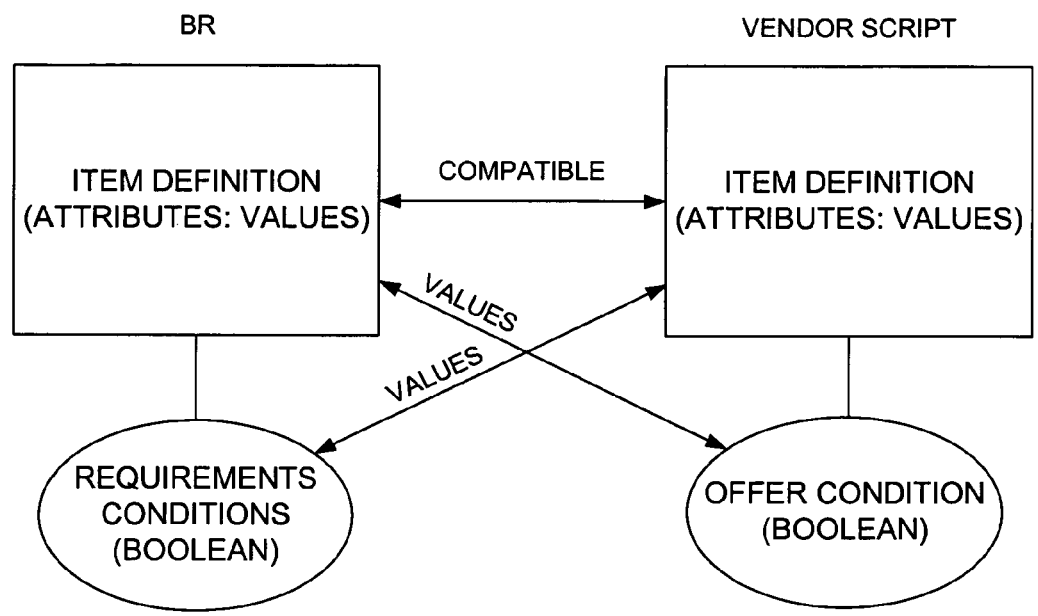
FIG. 19 illustrates matching a B.R. and vendor script that include conditions.

The purchase and vendor forms in an embodiment that includes condition(s) preferably have field(s) called "condition1," "condition2," etc., in which the specified condition(s) are stored. Satisfying a purchase form against a vendor form in such a case preferably involves evaluating the boolean condition(s) using well-known techniques for boolean evaluation. Preferably, values for items such as "airline" shown in the B.R. above come from attribute values in the vendor form against which it is being evaluated, in this case the value for attribute "Supplier." FIG. 19 illustrates matching a B.R. and vendor script that include conditions.

Figure 5:
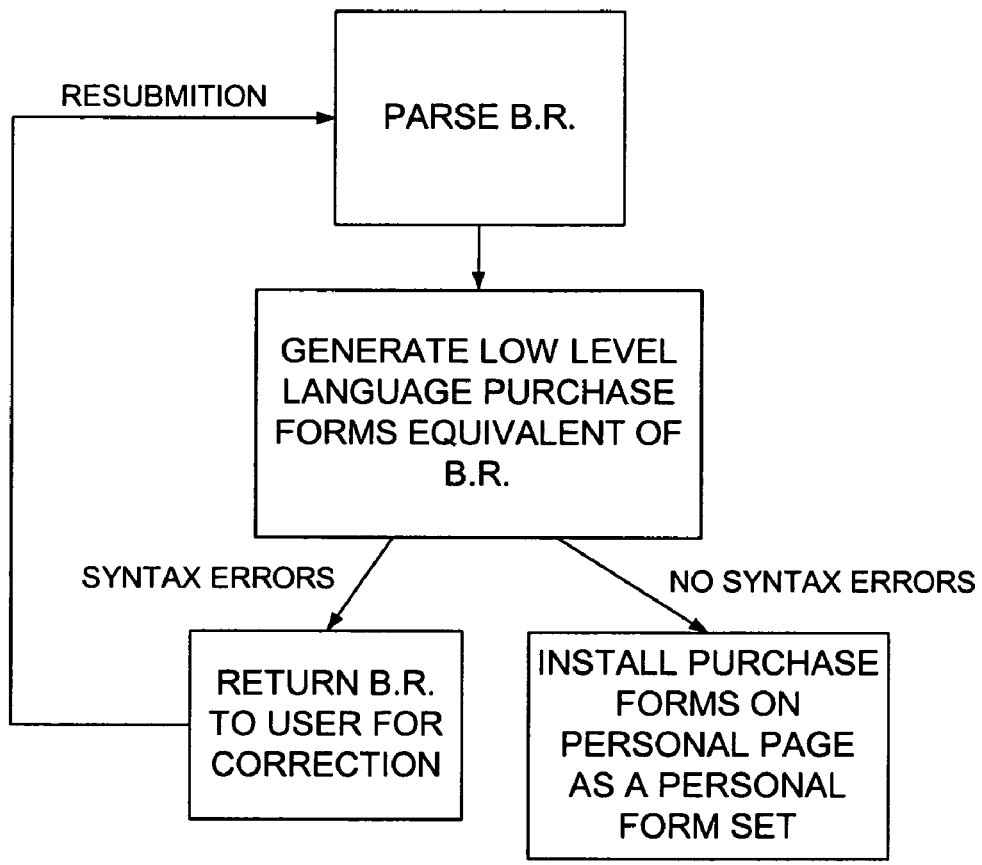
FIG. 5 illustrates how B.R.'s specified in a scripting language are handled.
Figure 6:
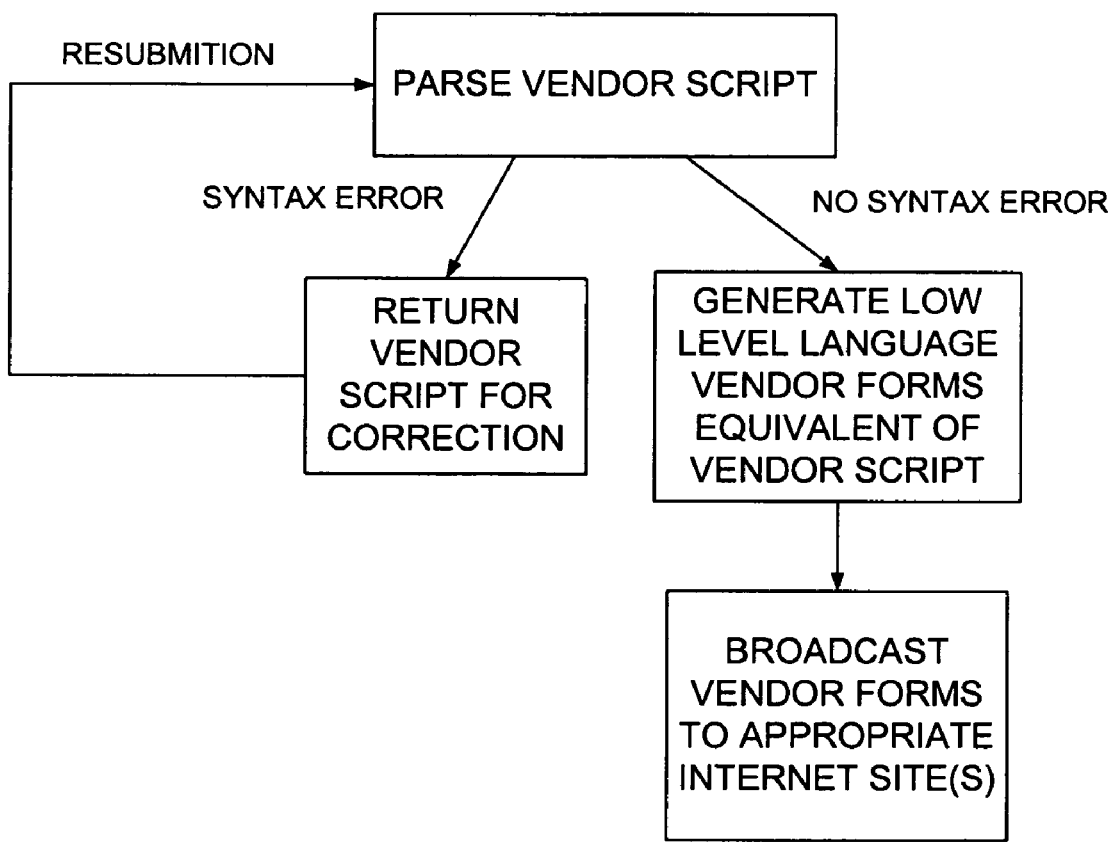
FIG. 6 illustrates how vendor scripts specified in a scripting language are handled.

In other embodiments, users are given the option of composing B.R.'s and vendor scripts in a scripting language reminiscent of a general purpose high-level programming language. This may be in addition to, or in place of, the electronic form technique discussed above, and may be combined with it. FIGS. 5 and 6 illustrate how B.R.'s and vendor scripts, respectively, specified in a scripting language are handled.

Discussed here is the technique for specifying B.R.'s, with vendor scripts being specified and defined in an analogous way. The user wishing to specify a B.R. expresses it in an IF-THEN-ELSE control structure, exemplified by the following extended BNF (Backus-Naur Form) grammar fragment, with (preferably reserved) language keywords appearing in bold:

| | |
|---|---|
| <B.R.>:: | <action><qualifiers> \| <if> |
| <if>:: | IF <condition> THEN <B.R.> \| IF <condition> THEN <B.R.> ELSE <B.R.> |
| <qualifiers>:: | <attribute> : <value> \| {<attribute> : <value>} |
| <condition>:: | well-known extended BNF describing boolean conditions in attributes and constants as found in languages such as SQL's "WHERE" clause, for example. |
| <action>:: | purchase \| sell \| trade \| license \| reserve \| rent \| lease \| . . . etc. |
| <attribute>:: | Item \| Place \| Price \| Quality \| . . . etc. |
| <value>:: | all nonempty strings of characters |

Though not shown here, bracketing pairs of symbols such as C's { . . . } or Pascal's BEGIN . . . END are preferably included in the language to allow the user to associate an ELSE with an IF other than the one closest to it. Techniques for disambiguating values from attributes are well-known in the art and found in such languages as SQL, for example. Grammar and language definitions other than the one above can be used in alternative embodiments.

An example of such a B.R. might appear as

```
IF price <$1500
    THEN purchase Item: round trip flight NYC-Hawaii
        Quantity: 2
        Date: >= Jan. 1, 2001
    ELSE IF airline ≠ TWA AND price <$2000
        THEN purchase Item: round trip flight NYC-Hawaii
            Quantity: 2
            Date: >= Jan. 1, 2001
        ELSE purchase Item: round trip flight NYC-Hawaii
            Quantity: 1
            Date: >= Feb. 15, 2001
```

Since a B.R. and a vendor script might mutually depend on one another and since satisfying a B.R. against a vendor script may be possible in more than one way, IF-THEN-ELSE B.R. and vendor scripts are preferably evaluated against each other to determine satisfiability as follows. The B.R. is parsed using known parsing techniques in the field of compiler construction and based on an appropriately defined grammar. During the parse, each portion of the expression corresponding in the parse to the nonterminal <B.R.> is converted using the technique shown above to a separate purchase form, since the data contained there is much like what the user would enter in an input form described above.

A vendor script is handled analogously, resulting in a similar collection of vendor forms. The purchase forms (vendor forms) are ordered according to their occurrence in the B.R. script, from top to bottom. This can be done, for example, at parsing time using an appropriately defined grammar and parsing technique. Preferably during the parse, each purchase form (vendor form) has associated with it a boolean condition that is the conjunction of all the IF conditions encountered on the path from the beginning of the B.R. (vendor script) to that purchase form (vendor form), with the proviso that ELSE results instead in the logical complement of its associated IF being used. Thus, in the previous example, associated with the three purchase forms in the order encountered in the parse are the conditions price<$1500

NOT (price<$1500) AND airline≠TWA AND price<$2000, and

NOT (price<$1500) AND NOT (airline≠TWA AND price<$2000)

The collection of purchase forms and vendor forms with their associated conditions are now evaluated pairwise against each other using the technique described above for a single pair of forms. In addition to all form fields being compatible, however, the two associated boolean conditions must both evaluate to true. (Values for attributes mentioned in the condition associated with a form are taken from the form provided by the other party.) Preferably, the order of evaluation is done in a way that respects the order of the forms as encountered in the purchase form sequence and vendor form sequence. Thus, for purchase forms and vendor forms $p_0, p_2, \ldots, p_{n-1}$ and $v_0, v_2, \ldots, v_{m-1}$ respectively, the order of consideration follows the order specified by execution of the C statement

```
for (i = 0; i < n; i++)
    for (j = 0; j < m; j++)
        evaluate p_i against v_j;
```

The first pair of forms that result in a satisfied B.R. successfully ends the evaluation, and the successfully matched pair are saved so that the deal between the user and vendor can be closed. If consideration of all pairs fails, then the overall evaluation fails and no deal is possible at this time. The implementation just described is biased towards the B.R. at the expense of the vendor script since the slower varying outer loop indexes through the p's while the faster varying inner loop indexes through the v's. In an alternative embodiment, the order of the loops can be reversed. In other embodiments, the order can be specified by the users and/or vendors. In other embodiments, the evaluation can be done in another order, even in a random order. In some embodiments, the order of evaluation can be nondeterministic.

Figure 7:
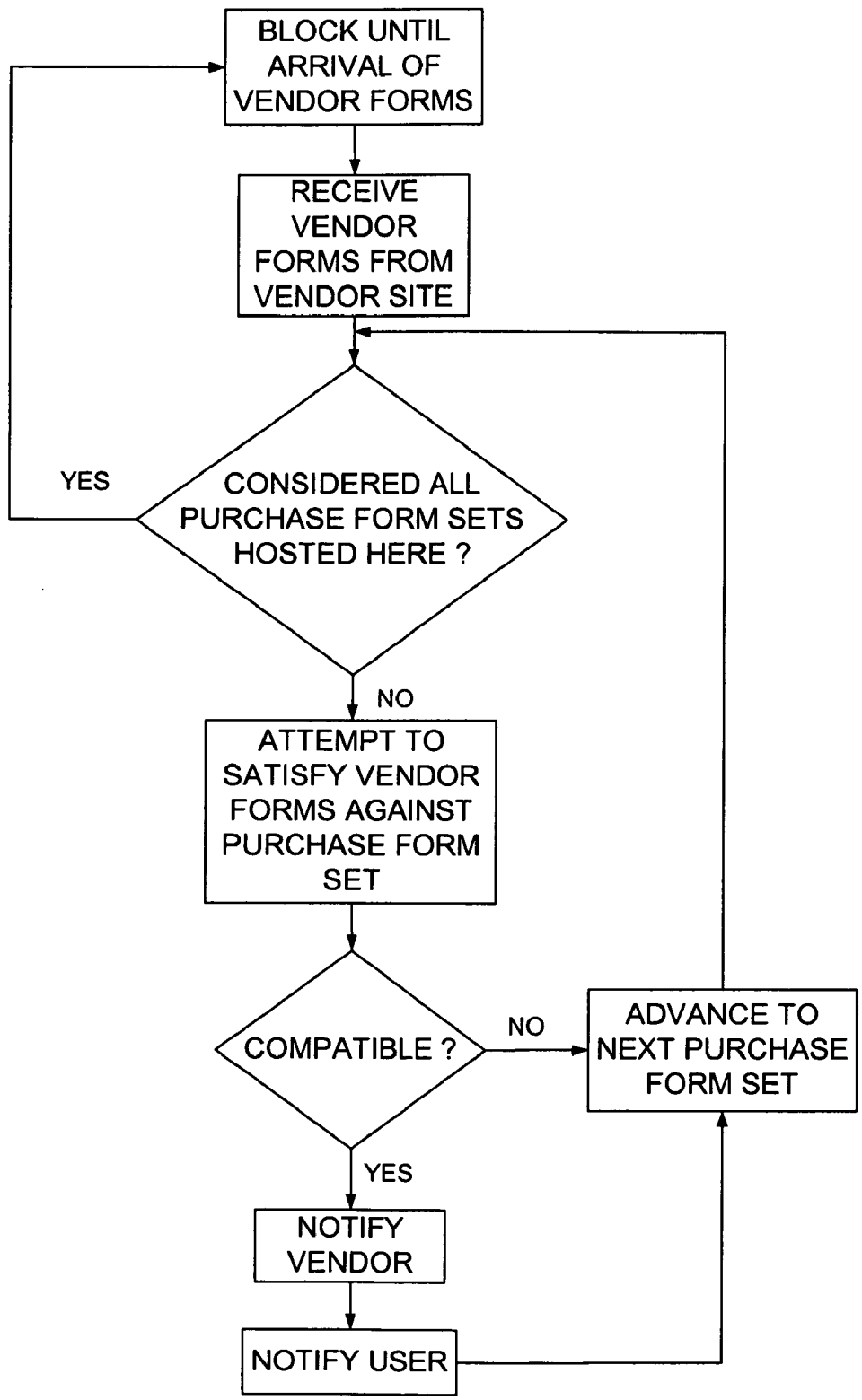
FIG. 7 illustrates system process handling checking newly arrived vendor forms for compatibility with purchase form sets.
Figure 8:
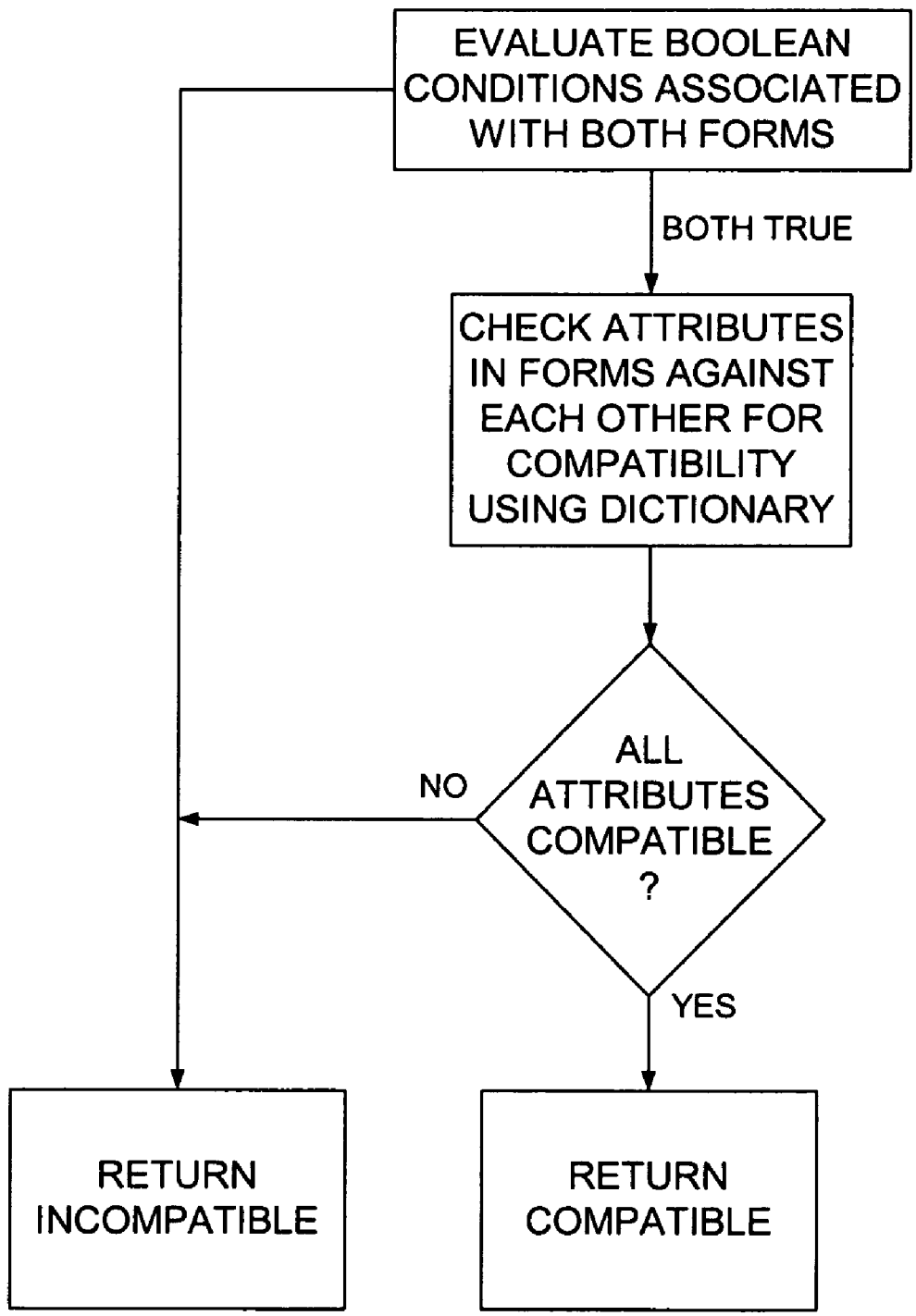
FIG. 8 illustrates the steps of deciding compatibility of vendor and purchase forms.
Figure 9:
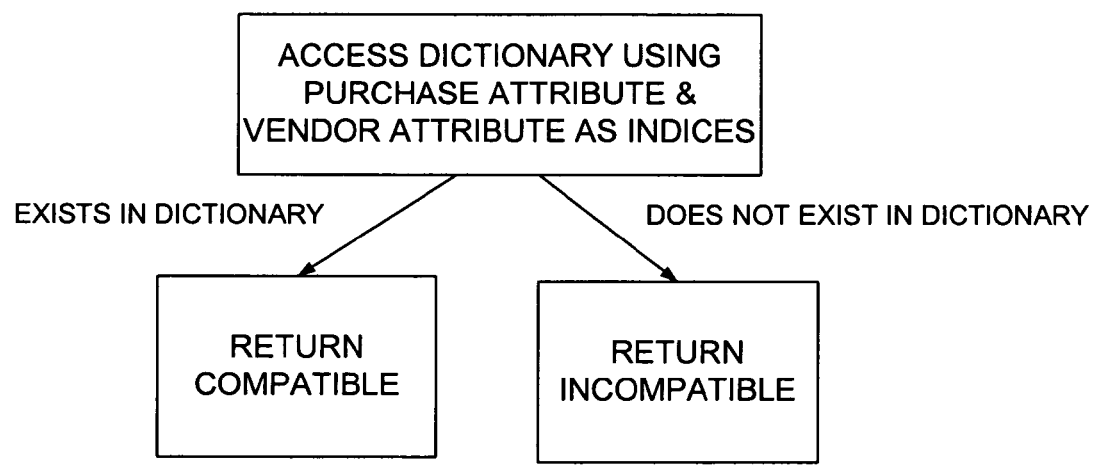
FIG. 9 illustrates checking form attributes for compatibility using a compatibility dictionary.

FIG. 7 describes software executing on a computer that determines compatibility between a vendor script and a B.R. As noted, this computer, depending on the particular implementation, can be a computer hosting a personal page, a vendor site computer, or another computer accessible to both. The system process in FIG. 7 awaits arrival of vendor forms from a vendor. Once received, the process considers all purchase form sets against the newly arrived vendor forms. The vendor forms are checked against each purchase form set for compatibility. A vendor and a user whose forms have been matched are notified as shown on FIG. 7. FIG. 8 shows how vendor and purchase forms are tested for satisfiability. First, the associated booleans are evaluated. If they both evaluate to true, then attributes on the forms are checked against each other for compatibility using a compatibility dictionary. (See FIG. 9.) If all attribute values are compatible, then the forms are deemed compatible, otherwise incompatible.

Figure 10:
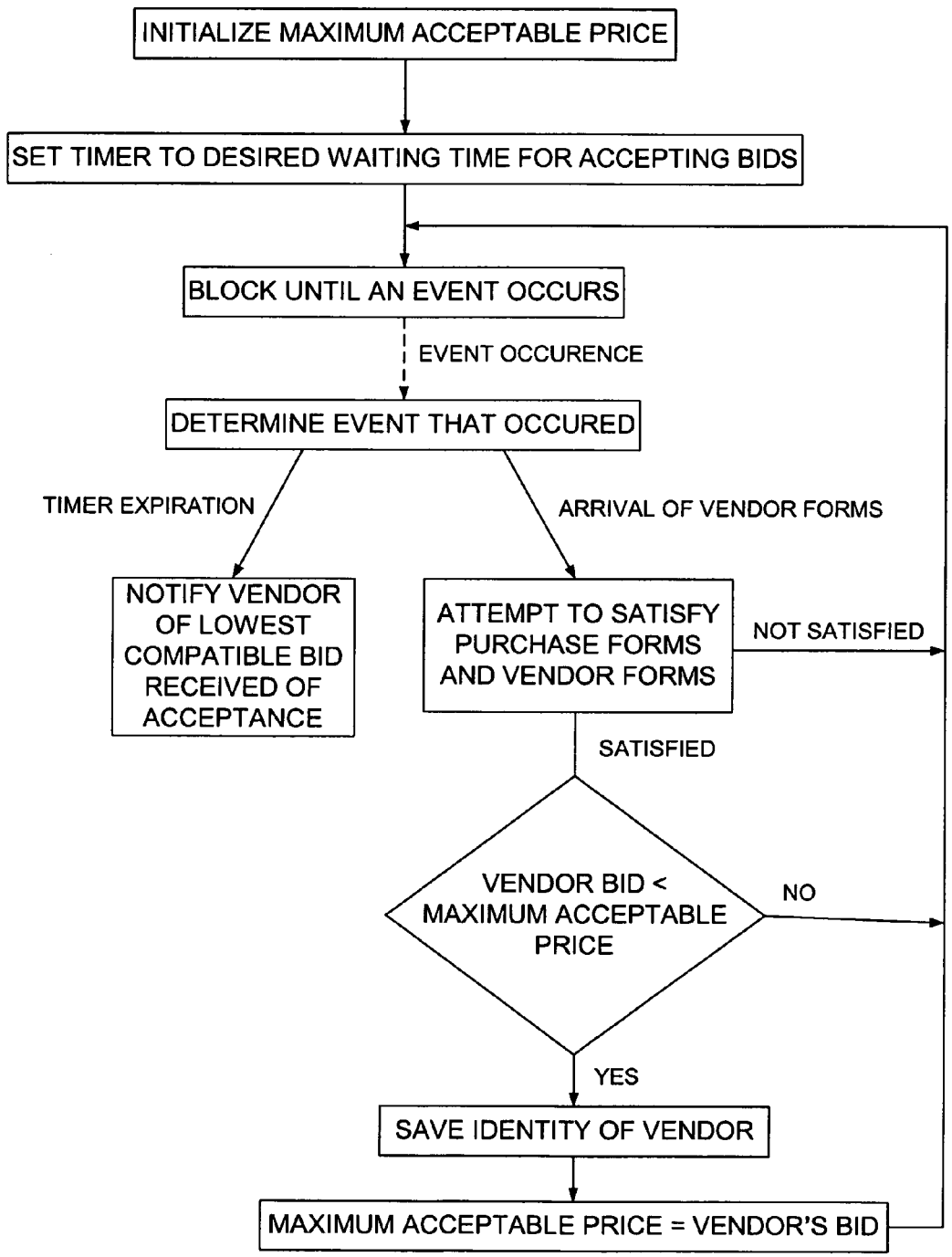
FIG. 10 illustrates software supporting bidding in connection with a user who desires to find a lowest priced item within a given time period.

FIG. 10 illustrates software supporting bidding in connection with a user who wishes to find the lowest priced item within a given time period. After a user indicates a maximum acceptable price, which is saved by the system, a timer is set for a desired waiting time during which bids are accepted. The executing process blocks until an event occurs, which is either expiration of the timer or arrival of vendor forms. On timer expiration, the vendor of the lowest compatible bid is notified of acceptance. On arrival of vendor forms, an attempt is made to satisfy the purchase and vendor forms. If not satisfied, the software blocks again. If satisfied, the vendor's bid is compared with the currently stored maximum acceptable price. If less, then the identity of the vendor and its bid are saved. The software then blocks until the next event occurs.

Another embodiment adds a production of the form

<B.R.> :: <B.R.>, <B.R.> to the grammar shown above, allowing B.R.'s (and/or vendor scripts) of the form

IF condition THEN $p_1, p_2$ ELSE $p_3, p_4, p_5$ for example, where the $p_i$'s are B.R.'s (vendor scripts). This allows the user (vendor) to specify several purchases (sales), for example, in a single B.R. (vendor script). The semantics associated with $p_1, p_2, \ldots, p_n$ are that all $p_i$ must be satisfied. Preferably, their order is immaterial, but in some embodiments the order may be relevant. Preferably $p_i, p_2, \ldots, p_m$ is satisfied against $v_1, v_2, \ldots, V_n$ if for each $P_a$ there is a $V_b$ and for each $v_c$ there is a $p_d$ such that the pair $p_a$-$v_b$ and the pair $v_c$-$p_d$ are each satisfied as described above.

Another embodiment of the matching process is described as follows. A B.R., in whatever form it is input, is first translated (compiled) into a lower language equivalent using language compilation and translation techniques known in the art. (This is described in more detail below.) The lower level language statement into which a B.R. is translated is referred to as "alternative purchase statement," whose syntax and semantics are similar but not identical to the generalized if-statement called an "alternative command" known in the computer programming art and described in detail in the textbook *The Science of Programming*, by David Gries, SpringerVerlag, N.Y., 1981, pp. 131–137 (incorporated herein by reference). Other symbols or codes can be substituted for the ones shown here by an ordinary person skilled in the art.

Just as an alternative command is composed of "guarded commands" (see page 131 in Gries), an alternative purchase statement is composed of "guarded purchase statements," each of the form guard→purchase-set where "guard" is a boolean condition (or TRUE in the case that no guard is necessary) and "purchase-set" is a set $p_1, p_2, \ldots, p_m$ Each $p_i$ is preferably a purchase form, as described above and, preferably, in most instances, the purchase-set has one element, i.e., m=1. In other embodiments, m>1 and/or each $p_i$ is either an alternative purchase statement itself or a purchase form. (This technique of defining a language structure recursively in terms of itself is known in the art.) In other embodiments, the $p_i$ can encompass other things as well, such as assignment statements, function calls, and other general purpose programming language features. In other embodiments "guard→" may be omitted in the case that the guard is TRUE, namely "TRUE→purchase-set" can be shortened to "purchase-set."

The guard acts as a logical guard at the gate→, making sure that satisfaction of the associated purchase set is attempted only under the desired conditions, namely that the associated guard is true. Preferably, order of the $p_i$'s is irrelevant. In other embodiments, the purchase set may be contained within delimiters, and written $\{p_1, p_2, \ldots, p_m\}$ for example. Other syntactic forms that indicate a set of items are also possible and known in the art. In some embodiments the order of the $p_i$'s may be significant.

Unlike the alternative command where execution is insensitive to the order of its constituent guarded commands because execution is nondeterministic (see page 111 in Gries), the order of the constituent guarded purchase statements in an alternative purchase statement is relevant to the matching process since the matching process is preferably deterministic. In some embodiments, however, the matching process may be nondeterministic. If the B.R. composition language is very high level and contains a nondeterministic OR connective, for example, then it is preferable that the matching process be nondeterministic as well. Some embodiments may include two types of alternative purchase statements: one in which the matching process is deterministic and another in which the matching process is nondeterministic. The description that follows describes the deterministic alternative purchase statement. Those skilled in the art can adapt and extend what is described here to the nondeterministic case.

An alternative purchase statement preferably takes the following syntactic form

[guard$_1$→purchase-set$_1$ □ guard$_2$→purchase-set$_2$ □ . . . □ guard$_n$→purchase-set$_n$]

where the □'s serve to syntactically separate the constituent guarded purchase statements. In other embodiments, the syntax may differ. Evaluating an alternative purchase statement is described further below.

For illustrative purposes, consider the IF-THEN-ELSE B.R. script shown above. It would be translated preferably into an alternative purchase statement such as

```
[[ price < $1500                                              → p₁
 □ price >= $1500 AND airline ≠ TWA AND price < $2000         → p₂
 □ price >= $1500 AND (airline = TWA OR price >= $2000)       → p₃
]]
``` where $p_1$, $p_2$, and $p_3$ stand for the three purchase forms shown in the earlier example and are abbreviated here merely for convenience. More complex B.R.'s would translate into correspondingly more complex alternative purchase statements.

Translating an IF-THEN-ELSE B.R. into an alternative purchase statement is done using compiler and programming language techniques as known in the art. Preferably, the translation procedure is such that an IF keyword in the B.R. results in a guard being generated, and a THEN or ELSE (without an IF following it) in the B.R. results in a new purchase form being generated.

In some embodiments, the user may be given the ability to compose alternative purchasing statements him/herself directly, thus bypassing the process of composing a B.R. that is then translated to a lower level language equivalent. In other embodiments, the user may be given the ability to compose purchase forms directly.

Preferably, vendor scripts are also translated into lower level equivalents, similar to the way B.R.'s translate. In alternative embodiments, however, only B.R.'s are translated while vendor scripts are left untranslated. In other embodiments, only vendor scripts are translated while B.R.'s are left untranslated. In other embodiments, vendor scripts and B.R.'s translate into different lower level language equivalents. It is also possible using natural language processing techniques known in the art of Artificial Intelligence to do the matching of B.R.'s and vendor scripts in their raw, untranslated form. In other implementations, B.R.'s and/or vendor scripts can be translated into equivalents in languages that are lower level than the one illustrated above.

Satisfying a user's B.R. is done preferably by evaluating the alternative purchase statement that it translates into against a similarly translated vendor script. (For convenience, we will continue to refer to these translations as B.R.'s and vendor scripts, respectively. As noted above, a form is a lower representation than a script. Also as noted above, a script is provided as a result of user input and then it is translated into one or more forms.) We first describe the technique of trying to satisfy a B.R. against the simplest of vendor scripts, namely, one that translates into the equivalent of a single vendor form. The technique for dealing with more complex vendor scripts is described below. We will describe the technique for dealing with a single vendor script. The method can be extended by one skilled in the art to the situation of several vendor scripts. The technique preferably proceeds as follows. A (deterministic) alternative purchase statement is evaluated sequentially from top to bottom, i.e., from the first guarded purchase statement to the last. Evaluation terminates successfully when a guarded purchase statement is satisfied, and unsuccessfully if all guarded purchase statements cannot be satisfied. A guarded purchase statement is satisfied by a vendor script if its guard evaluates to true and all $p_i$'s in the associated purchase set can be satisfied against the vendor form. Evaluation of a guard may involve the querying of a vendor's Internet site, similar to the way guards in the concurrent programming language known as Communicating Sequential Processes (CSP) can contain interprocess communication commands. Satisfying a purchase set is might also involve accessing an Internet site. (This is analogous in CSP to the appearance of interprocess communication commands in the nonguard portion of a guarded command.).

We now describe the way of satisfying a B.R. against a more complex vendor script. (The technique can be extended to the case of several vendor scripts.) In this case, the B.R. and vendor script each translate, preferably, to alternative statements of the form

[u-guard$_1$→purchase-set$_1$ □ u-guard$_2$→purchase-set$_2$ □ . . . □ u-guard$_n$→purchase-set$_n$] and
[v-guard$_1$→vendor-set$_1$ □ v-guard$_2$→vendor-set$_2$ □ . . . □ v-guard$_m$→vendor-set$_m$]

respectively. The system then combines the two into a single alternative user-vendor statement $$\left[ \underset{i=1, j=1}{\overset{n,m}{\square}} u\text{-}guard_i \wedge v\text{-}guard_j \rightarrow purchase\text{-}set_i; vendor\text{-}set_j \right]$$

where "∧" is logical conjunction of the two guards. Preferably, the guarded statements are combined so that smaller i,j values appear before larger ones to respect the order of evaluation in the original guarded statements. The alternative user-vendor statement is then evaluated preferably using the technique described above, with the added provision that "purchase-set; vendor-set" is satisfied if for each $p_a$ in purchase-set there is a $v_b$ in vendor-set and for each $v_c$ in vendor-set there is a $p_d$ in purchase-set such that the pair $p_a$-$v_b$ and the pair $v_c$-$p_d$ are each satisfied as described above.

After a user's B.R. has been found to be satisfied by a vendor script, the processing moves to the next stage of deal closure. When a match has been identified as discussed herein, the deal can be closed in one of three ways: (1) it can close automatically; (2) it can be closed only after user confirmation; or (3) after additional verification by all parties regarding the terms of the deal. For example, the first case pertains to the purchase of simple consumer goods, e.g., groceries or staple articles of commerce. The second case may be used for more complex purchases, e.g., airline tickets. The user confirmation in this case can be provided by an electronic message from the user in textual or voice form (subsequently converted to data) or another form known in the art. The third one is typically used for transactions that are sufficiently complex that they require a formal agreement.

Figure 11:
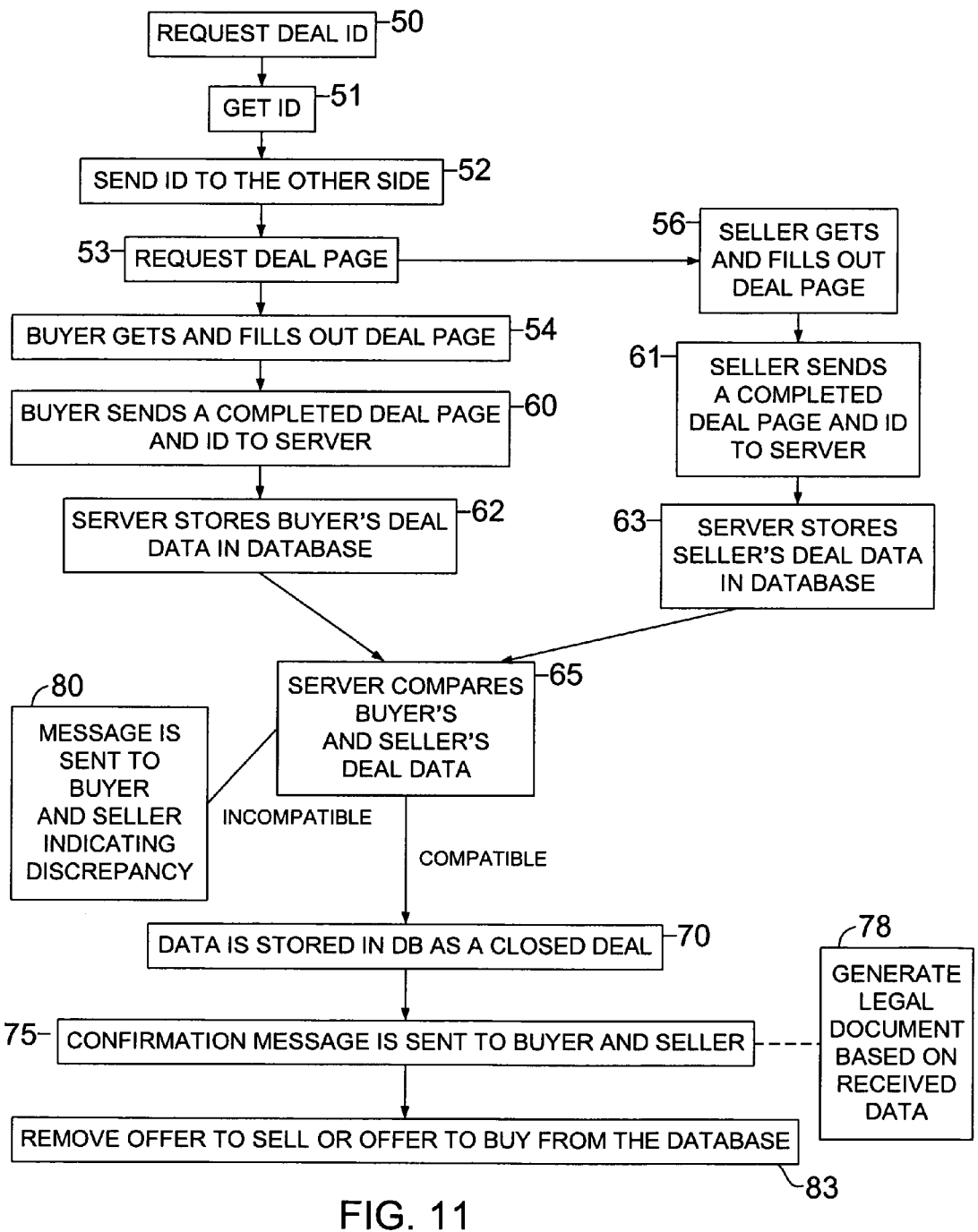
FIG. 11 illustrates the preferred processing for closing a deal between a buyer and seller who require verification of agreement.

FIG. 11 illustrates the preferred processing for the third case, where the system processes the closing of a deal between a buyer and seller who require verification of agreement. Although shown here is a single buyer and a single seller effecting a transaction (i.e., a two-way deal), those skilled in the art can readily extend the technique shown to a multi-way transaction (multi-way deal) involving several sellers and/or several buyers. At 50, one of the parties to the deal, the seller, for example, requests a deal identifier (ED) from a server supervising the closing of the deal, e.g., the server hosting the personal page. The deal ID is a unique identification of the particular deal, allowing distinguishing from other deals. Techniques for generating unique ID's are well known in the art, and can be done, for example, by storing an integer at the server that is incremented each time a deal ID is requested, this incremented value becoming the latest deal's ID. Other techniques are known in the art for generating unique ID's in distributed environments where there is no single central computing facility such as a server. When the party requesting the deal ID transmits such request to the server, the server generates the ID and transmits it back to the requesting party's client computer. (See 51.) Alternatively, a party may have requested a number of deal ID's from the server previously and stored them in the local memory of his/her client computer. Then, to close a given deal, the party selects one of these unused deal ID's. As shown at 52, the user then sends the deal ID to the other party by email or by Instant Message (IM) or by voice telephone or in person or by postal mail or by any other method or means he/she deems appropriate. Alternatively, the server can forward the same deal ID to both parties simultaneously eliminating the need for one party to send it to the other. Once both parties have received the same deal ID, one or both parties request that the server transmit forms to both parties for a particular type of deal. Types of deals may include, for example, sales, swaps, licenses, etc. The form may include a description of the property or properties involved in the transaction, identification of the parties involved, selling price if applicable, license fees if applicable, date of effect, other terms and conditions, etc. In response, the server transmits the deal forms to both parties of the deal. Thereafter, both parties independently fill out the terms of the deal using the form received from the server. In some embodiments both parties may attach a digital signature to the form Then, both parties send their respective forms to the server, though not necessarily simultaneously. (See 60 and 61.)

The server receives the electronic forms from the parties and stores this information in the database as a deal-in-process. Once the server has stored the forms from both parties as a deal-in-process, it compares the fields in the records identified by the same deal ID's. (See 65). If the fields in the records are compatible, the server marks the deal as closed. In the preferred embodiment, compatibility is defined by the fields being identical, but in other embodiments compatibility can be defined by looser criteria, such as, for example, selling price and buying price differing by less than a designated percentage, the term "12 months" being considered equivalent to the term "1 year," the "term 30 days" being equivalent to "1 month," etc. Such techniques for defining compatibility and implementing software accordingly are known to those skilled in the art. Alternatively, the compatibility dictionary technique described above can be used here as well. Once the deal is closed, the server sends confirmation messages, by email, for example, to both the buyer and the seller. It may also generate an electronic and/or non-electronic agreement and attach the electronic and/or non-electronic signatures provided with the forms when such signatures have been supplied. (See 78.). If at 65 the terms did not match, the system sends a message to both the buyer and the seller indicating the discrepancy. (See 80.) Alternatively, only one of the parties is notified that there is a discrepancy. (It may be the party initiating the transaction, or it may be the seller, for example.) In one embodiment, the user (or vendor) can also indicate requirements at a higher syntactic and semantic level, from which the system will translate to lower level equivalents using techniques found in the art. Thus, the user can specify, "I wish to get a haircut LIKE my haircut last month," and the system will retrieve the prior month haircut purchase and use it to compose the currents purchasing requirement. (Keywords such as LIKE shown here may be introduced into the requirements composition language to provide additional expressiveness.) A full macro capability may also be made available to the user, as well as language learning techniques adopted from the area of Artificial Intelligence so that the system may over time and possibly with training "learn" the semantics associated with the personal language style of the user. Automatic voice recognition techniques, as known in the art, may also be used to compose the B.R. data directly from user voice input. Graphical specification methods and devices as are known in the art may also be used, including but not limited to GUI techniques.

Various capabilities associated with general purpose procedural programming languages, such as, for example, variables, branching logic, and repetitive constructs, may be employed for constructing B.R.'s and vendor scripts. Functions found in general programming language environments may also available, such as MAXIMUM and MINIMUM, for example. Special keywords, preferably, may also included, such as LOWEST PRICE, MINIMUM DISCOUNT, SUPPLIER OF, and GRADE, for example. Further, features of nonprocedural programming languages, such as are found in PROLOG or parts of SQL (ANY, ALL, and SOME, for example), may also be included in the B.R.'s and vendor scripts.

Libraries of B.R.'s and vendor scripts can be made available to the user to aid in composition. Using the history of previous purchases made by a particular user, the system may be able to detect patterns of purchase, which the system can then use to automatically compose or translate purchasing requirements and bidding rules for him/her.

The system as a whole may also build a database of B.R.'s generated by the users of the system over time and evolve an understanding of patterns of language use that will enable more automatic translation of high level requirements into lower level equivalents. The user can also indicate default requirements that ought to apply in the absence of ones specified for a particular purchase. In addition, the user can designate certain bidding rules and purchasing requirements that must apply to all or some purchases even when not explicitly included for a particular purchase. (For example, the user may indicate that "All products must adhere to Milspec standards," or "All software must be Y2K compliant," or "All meat must meet USDA Grade A standards," or "All products must be manufactured in the United States," or "All consumer products evaluated by Consumer Reports must be rated 'A Best Buy'.") In some embodiments, the user can reference other users' purchasing requirements and bidding rules, and may even extend them. ("Use John Smith's bidding rules and requirements for all products except software.") Users can make some or all of their rules and requirements available to others, and the language for controlling visibility and adoption and extension of one's bidding rules or purchasing requirements by others can be similar to the way visibility and sharing is controlled in other areas of computing, for example, PRIVATE and PUBLIC scoping rules and CLASS extension in Object Oriented Programming languages.

Purchasing requirements can have conditional temporal components as well. ("In winter all oranges must originate from Florida and in summer all oranges must originate from South America," or "Purchase 1000 bushels of wheat before December 15."). Various trading rules and strategies may also be associated with the personal page, and the language for expressing them is, preferably, similar to the language used to express purchasing requirements as discussed above.

Items that can be purchased through the personal page can be selected from a searchable database of all available items. Preferably, a large fraction of items available commercially are included in the database. In the case that such a database is used, the user causes invocation of a conventional database search, locates the desired item that conforms to the user's requirements, selects it, and specifies delivery requirements. In some cases, the user can select a generic item, e.g., a computer with certain memory and storage characteristics, without specifying the brand. (The language may include a BRAND keyword to facilitate this.)

As noted, since the personal page is associated with a specific user (and perhaps his/her designees), it can include voice data for speaker dependent voice recognition, as described above, which can provide high quality recognition. Upon recognition of the voice command specifying the order, a confirmation can be displayed to the user. In addition, the user can provide such a voice order from his/her Internet enabled cellular phone, or even from a conventional noncellular phone. The user touches a button that automatically connects to his personal page and then speaks the order on the telephone. The order is voice-recognized and parsed. Optionally, then, the user is provided with a confirmation of the order that is read back to him/her on the phone. Various sequences of steps can be employed for providing voice input to a personal page. One example of voice input is shown in FIG. 3.

Sites that host the personal pages of multiple users can provide the ability for collective bidding. That is, software at these sites may scan personal pages and identify common desired items and constraints associated with them. Then, common items with similar constraints can be pooled so that users are well positioned for volume purchasing. These aggregated items can be pooled to separate super-personal-pages ("virtual personal pages") which are also visited by vendors' electronic representatives. In yet another embodiment, software agents can "roam" users' personal pages on the network and organize buying pools by generating virtual personal pages.

Such an arrangement, where each user conducts electronic commerce using a personal page, provides enhanced privacy to the user. The user can specify whether he/she wants none, or some, or all the marketing information contained on his/her personal page to be visible to others and perhaps pooled and, if so, on what conditions. From the vendor side, marketing organizations have a very valuable commodity when they gather marketing data made visible by a user from his/her personal page, since all of a user's market activities are captured centrally on that page.

Figure 12:
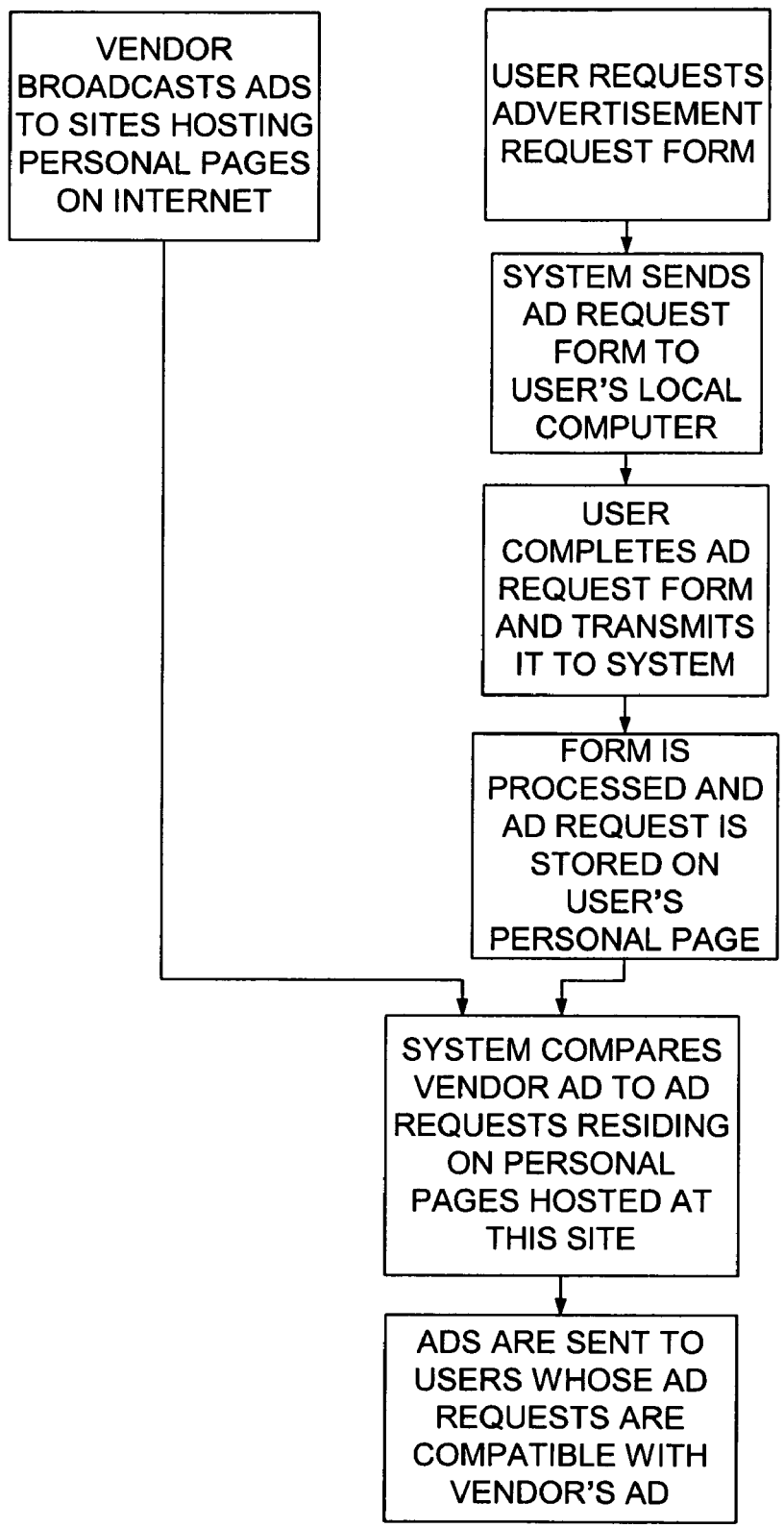
FIG. 12 illustrates providing advertisement to a personal page.

The user may also control advertisement using the personal page technique. A user could actively invite selective advertisements, which would then be provided to the user by vendors' electronic representatives. This feature could be implemented by the marketplace (described below in an alternative embodiment), where users' invitations for advertisements are matched with vendor electronic representatives. Alternatively, the system could allow electronic advertisement representatives, similar to vendor electronic representatives described above, to be sent to personal pages, which are then matched with users' invitations for advertisement. See FIG. 12. Preferably, personal pages are not financed by advertisement, but instead by small transaction fees charged by the marketplace or by the vendors or vendor associations.

As noted, desired items on personal pages are not limited to specific goods but may also include services. Such requests for services may specify additional relevant parameters, such as a requested time for the service to be provided. In the preferred embodiment, the electronic representatives of service providers attempt to accommodate such service requests. Upon a match on price, time, location, etc., the service is scheduled accordingly and the user is notified. Service requests can be very general, such as "Provide a man's haircut<$45 in midtown Manhattan after 5 pm any day next week." Similarly, vendors' electronic representatives can have calendar features, such as "Fill 4 pm slot for man's haircut costing>$30 on West 45 Street in Manhattan at 6 pm next Tuesday." In the preferred embodiment, the marketplace will match service requests with vendor representatives in an optimized fashion using scheduling optimization techniques as is known in the art, thus creating a more efficient service economy.

Items can be delivered to the user physically, e.g., by a carrier to his home, or they may be delivered electronically, i.e., by downloading them (e.g., music and books) to the user's local computer. Physical delivery can also be provided from a center where a user would be able to review and exchange items.

A personal page may include banking information for making payments (e.g., credit card data) and obtaining banking services. Since the personal page may be where a user conducts business, adequate security, preferably, would be provided to assure protection. This information can be easily retrieved by a user with a cell phone or hand held mobile Internet appliance. Also, highly personal data, such as medicine prescriptions that must be periodically renewed, can be located on one's personal page.

Vendors may post information about items they offer on their Web sites. Preferably, then, the system would gather this published data and combine it into a list of available items. Thus, the system periodically updates the database of available items by visiting Web sites of vendors. Alternatively, vendors may submit information about the items they offer for inclusion in the system database.

Purchase strategies can be expressed in the B.R. (vendor script) at a high level. For illustrative purposes, consider the following simple high-level B.R.:

PURCHASE m tons of wheat from SUPPLIER A if it can deliver m tons, BUT IF it cannot THEN IF price from SUPPLIER B<$x THEN PURCHASE n tons ELSE PURCHASE p tons from SUPPLIER C.

It would be translated preferably into an alternative purchase statement such as

| | |
|---|---|
| [[ supplier A can deliver m ton of wheat | → purchase m ton of wheat from supplier A |
| ☐ supplier B sells wheat < $x/ton | → purchase n ton of wheat from supplier B |
| ☐ TRUE | → purchase p ton of wheat from supplier C |
| ]] | |

The three purchase sets shown here are actually simple purchase forms as described above. More complex B.R.'s would translate into correspondingly more complex alternative purchase statements.

In some embodiments, the system can maintain a library of the most common high level B.R.'s (vendor scripts), which have been pre-translated—manually if necessary—into equivalents in lower level IF-THEN-ELSE scripts or alternative statements. These high level B.R.'s (vendor scripts) can be quite complex, and are preferably parametrically defined, with values for the parameters supplied by the user at the time of use. The user then chooses an appropriate B.R. (vendor script) from the library and supplies parameter values such as price, delivery date, etc. The user may even be given the ability to compose boolean conditions for particular parameter slots. The library can evolve over time using Artificial Intelligence techniques to include ever higher level B.R.'s (vendor scripts). Libraries of B.R.'s (vendor scripts) can be managed similar to the way compatibility dictionaries are managed as described above.

In addition to the attributes discussed above, many others can be used as well: credit rating, previous history, etc., for example. The B.R. (vendor script) language and its associated software can provide the capability of creating purchasing strategies whose evaluation logic is dynamically based on the offers (requests) they receive, i.e., dynamically determined at the time the B.R. is evaluated against the vendors' scripts. In addition, software may initiate searching databases of suppliers with a presence on the Web (but not necessarily combined on the same site) and retrieve all relevant data if the user has so indicated on his/her personal page.

Strategies can be defined that change dynamically based on external criteria. For example, if the purchaser is a manufacturer who buys various items required for its manufacturing process, its purchasing strategy may be dynamically determined by the number of outstanding orders it currently has for its products, and may involve, for example, asking for a bulk discount because it is making larger purchases. Similarly, vendor scripts can have similar dynamic features.

Also, several users can develop common, joint purchasing strategies, joining together to purchase items they both need. If, for example, one user's business is slow and another one's is doing well, the allocation between them of their common purchases can change. The adjustment can also be dynamic and automatic, based on the volume of orders appearing on their Internet sites, for example. Suppliers can also cooperate to meet the requirements of these strategies, subject of course to the relevant anti-monopoly and trust laws and regulations.

Figure 13:
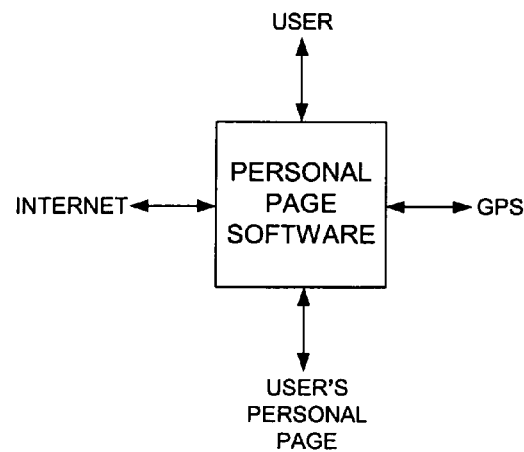
FIGS. 13, 14A and 14B illustrate personal page applications using dynamic geographical location input data.
Figure 14A:
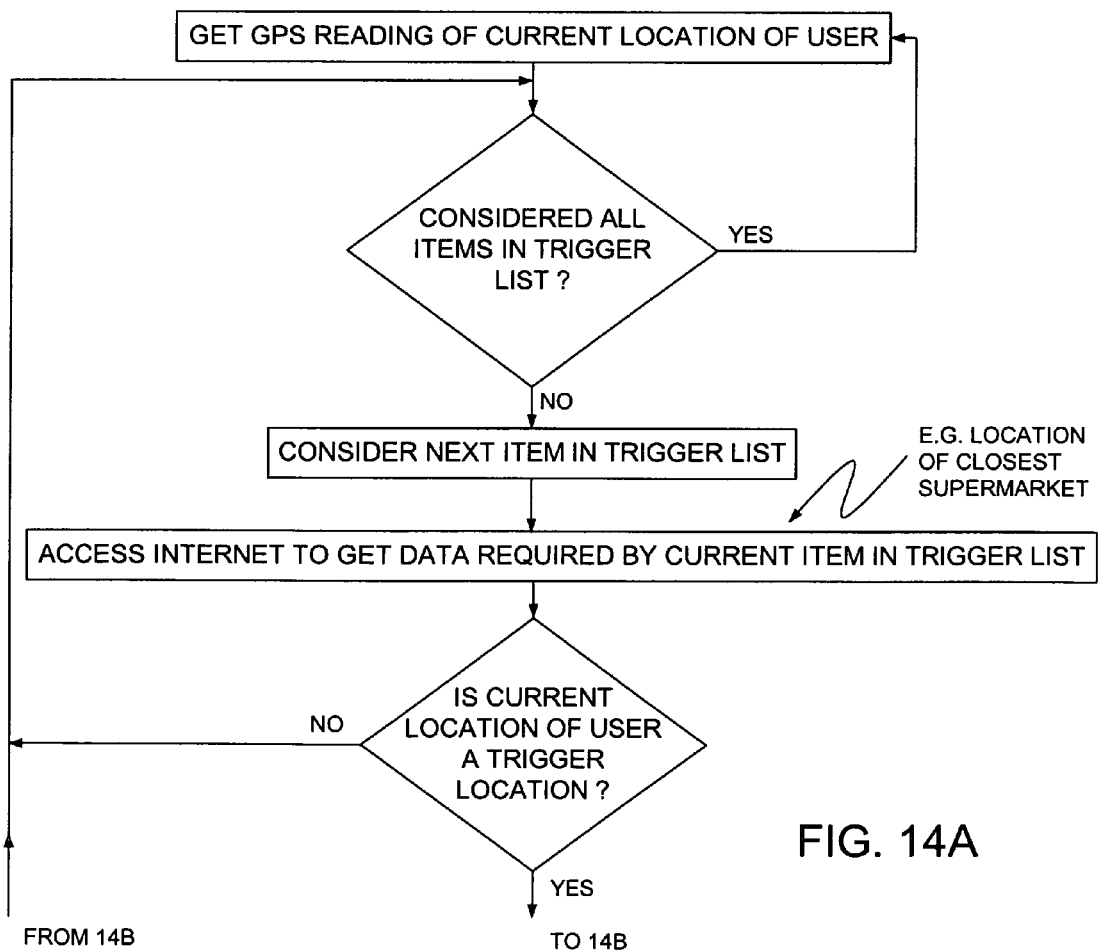
Figure 14B:
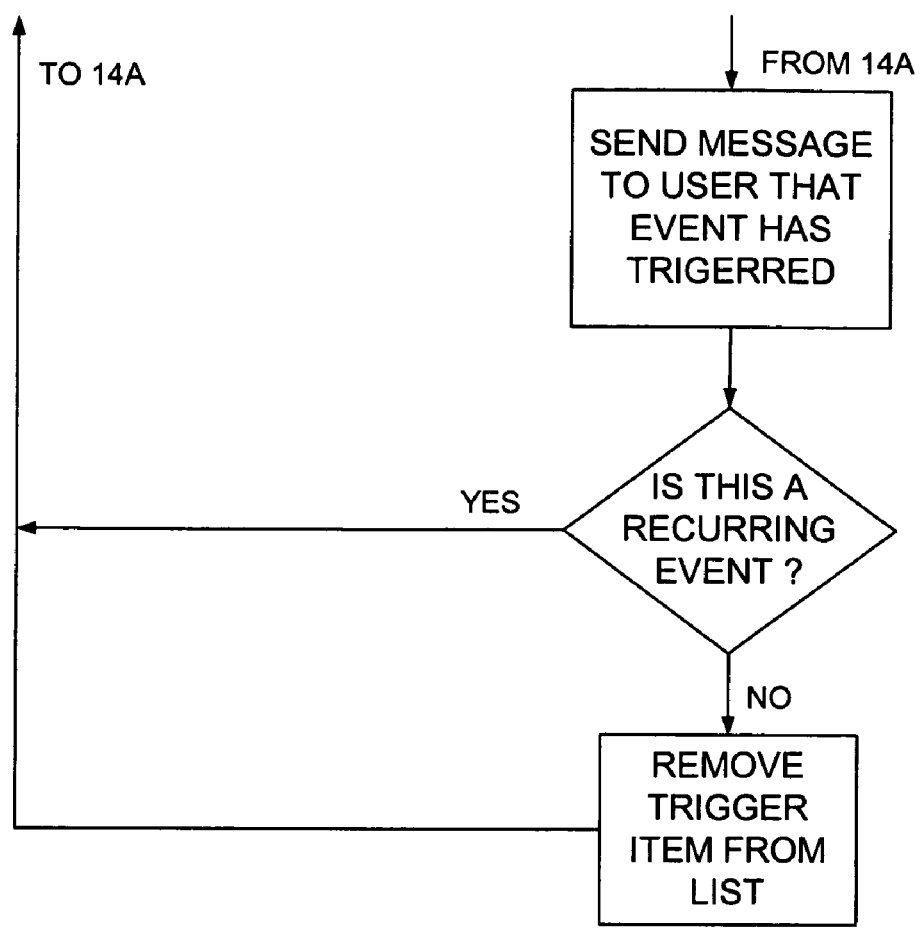

The personal page is generally useful, with application beyond what has been described thus far. It is preferably a programmable Web-page like electronic entity with partial or total visibility to other Internet participants. In the preferred embodiment, the user can access his/her personal page through means such as, for example, wireless handheld Internet devices, wireless is networks, voice recognized input devices, cable, cellular telephones, etc., as well as traditional Internet access devices such as the Personal Computer communicating with an Internet Service Provider (ISP) by telecommunications. In other embodiments, the user carries an electronic device such as a wireless Internet communicator (or is in a vehicle so equipped) that is in electronic contact with the Global Positioning System (GPS), and this electronic device is also in electronic communication with his/her personal page. Thus, the personal page software has access to the geographical location of its owner, and the personal page software logic executes in accordance with that current geographical location. For example, if such a user has programmed the personal page to notify him/her should he be within five highway miles of the home of his aunt, who is ill, and the user chances to enter the five mile distance, then the personal page software logic will notify him/her through his electronic communicator that he should visit his sick aunt. Similarly, for example, the user can program the personal page to be notified if he/she passes within two blocks of a supermarket to buy a quart of milk. The personal page may have electronic access also to other user appliances, such as his/her automobile, for example, and the user may be notified by personal page software logic that the fuel level is low and that he/she is now within one mile of a gas station. Or, for example, if there is a mechanical malfunction in the automobile, the personal page software may notify the user that he/she is within a certain mile distance of an authorized repair shop, and may even guide the user to that destination in accordance with GPS. See FIGS. 13, 14A, and 14B.

The personal page, preferably, can be accessed by the user using voice recognized input techniques as are know in the art. The user speaks instructions into an electronic device connected to the personal page, which may be a suitably equipped cellular phone, for example, and issues instructions that cause the personal page to be appropriately programmed. Once programmed, the personal page can be visited by other Internet participants who interact with it. So a user, for example, might speak the instruction "Make an appointment with a dermatologist" into a cellular telephone and voice recognition software will, preferably, translate and it into an appropriate construct that is stored on the user's personal page, which then can be visited by software agents associated with dermatologists looking to fill their appointment calendars. See, e.g., FIG. 3.

Similarly, user's personal data can be stored on the personal page as well. Users' medicine and vision prescriptions and other medical history or conditions and data; dental records; personal dining habits (which restaurants, which kinds of restaurants); clothing and shoe sizes; cultural and social preferences; schools attended; financial history and credit data; domestic and foreign travels; criminal records; purchases made; photo and voice data; family data; etc., are all examples of things that can appear there. Personal historical data may also appear, such as service in the armed forces, jobs held, educational test scores, etc. Other embodiments may contain data and types of data not listed here. Personal page software can then use the stored data in its interaction with the Internet and/or with the page's owner. For example, in an embodiment where the personal page interfaces to GPS, as described above, the personal page software may notify the user that he/she is now three blocks away from a pharmacy where he/she should refill a medicine prescription that is running low. Similarly, personal page software may inform the user that he is two blocks from a shopping mall and next week is his/her mother's birthday. See, e.g., FIGS. 13, 14A and 14B.

Other entities may also have access, albeit preferably in a limited way, to a user's personal page. A pharmacist filling a user's prescription may enter that fact along with relevant data onto the user's personal page. Similarly, all or some of a user's medical records could be stored on his/her personal page, thus providing easy and instant access to those records by any doctor treating the user. In alternative embodiments, all or part of the user's personal page could be stored in a nonvolatile, compact form, on a programmable mini-disk, for example, for immediate access. In some embodiments, special purpose electronic devices for interacting with a user's personal page could be available. When applying for a loan, for example, the user could insert his/her personal page mini-disk into a special reader located on the bank's premises, thus giving the loan officer instant access to the applicant's financial data and/or history and/or criminal record. In other embodiments, instead of presenting the bank with a mini-disk that is then read at the bank, the user may allow the bank software access to his/her personal page located on the Internet.

In some implementations, the user's personal page could be used as a passport when traveling, in lieu of the hard copy booklet now used for that purpose. The user could present a mini-disk passport when entering or leaving a country, which would be read and/or written onto by a special reader. In other embodiments, the user could make accessible his/her personal page located on the Internet to passport officials when entering or leaving a country. Using encryption techniques known in the art, such data could be made secure.

The personal page could be used as personal identification by the user in some embodiments. If the personal page contains photo images of the user, for example, then it could be used as a photo id. It could also contain user voice data, thus acting as a voice id as well. Law enforcement agencies could use a convicted criminal's personal page to keep track of the whereabouts and dealings of the user, for example, and government agencies could use the personal page as an electronic "license", say a drivers license or firearms license for instance. In that case, special readers, perhaps wireless and hand held, could be used by police officers in accessing the personal page. In other embodiments, the personal page license may be accessed on a mini-disk carried by the user.

In addition to the applications described thus far, the personal page has other uses as well. For example, it could be used by its owner to substantially optimize his/her purchases and acquisitions of goods and/or services. The user indicates on the personal page, for example, that he/she wishes to buy gifts for three friends, and that the total outlay should not exceed a certain cost, say $400. He/she can also indicate preferred categories of gifts, such as golfing equipment for the first friend, music CD's for the second friend, and books for the third. The user may have the opportunity of providing even finer purchasing requirements, such as indicating a category of CD's, say classical music, from which the purchase is to be made. Similarly, he/she can indicate that the cost of a particular gift is to be no less than a given amount, or between certain minimum and maximum amounts. Other possibilities that constrain the purchase as known in the art are also possible.

Once the purchasing requirements have been input, personal page software, preferably interacting with various sites on the Internet, compute various substantially optimal purchasing strategies using optimization techniques as are known in the art. (In alternative embodiments, interaction with the Internet may not be necessary. This would occur, for example, if the personal page software has locally available to it an appropriately extensive database of goods and services available for purchase.) The substantially optimal purchase decisions are presented to the user, who has the option of choosing among them. The user can then choose, if so desired, to purchase one or more of these items online, using purchase techniques as discussed above, such as B.R.'s.

Figure 15A:
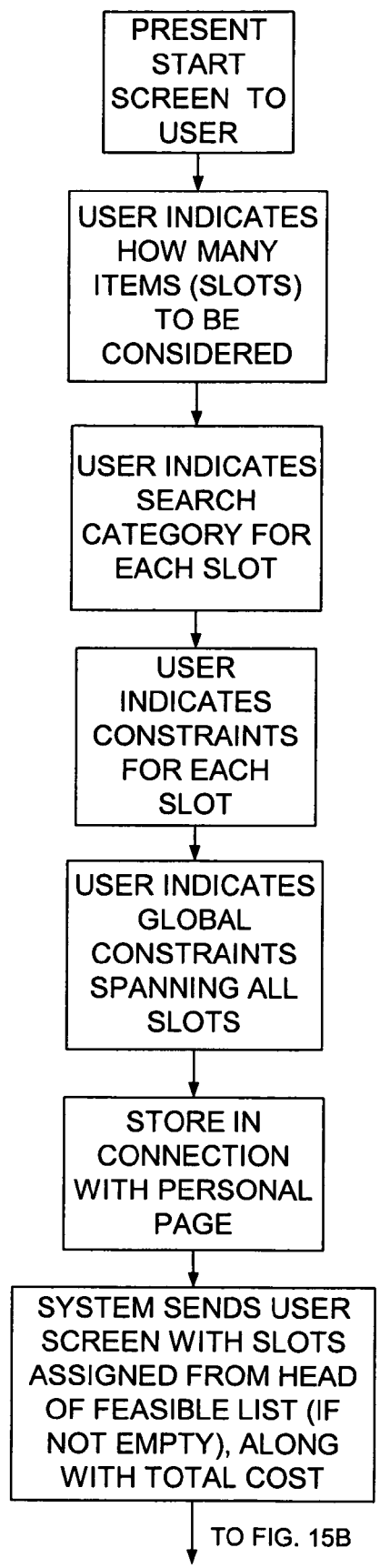
FIGS. 15A and 15B illustrate interaction with a user for substantially optimal purchase selection.
Figure 15B:
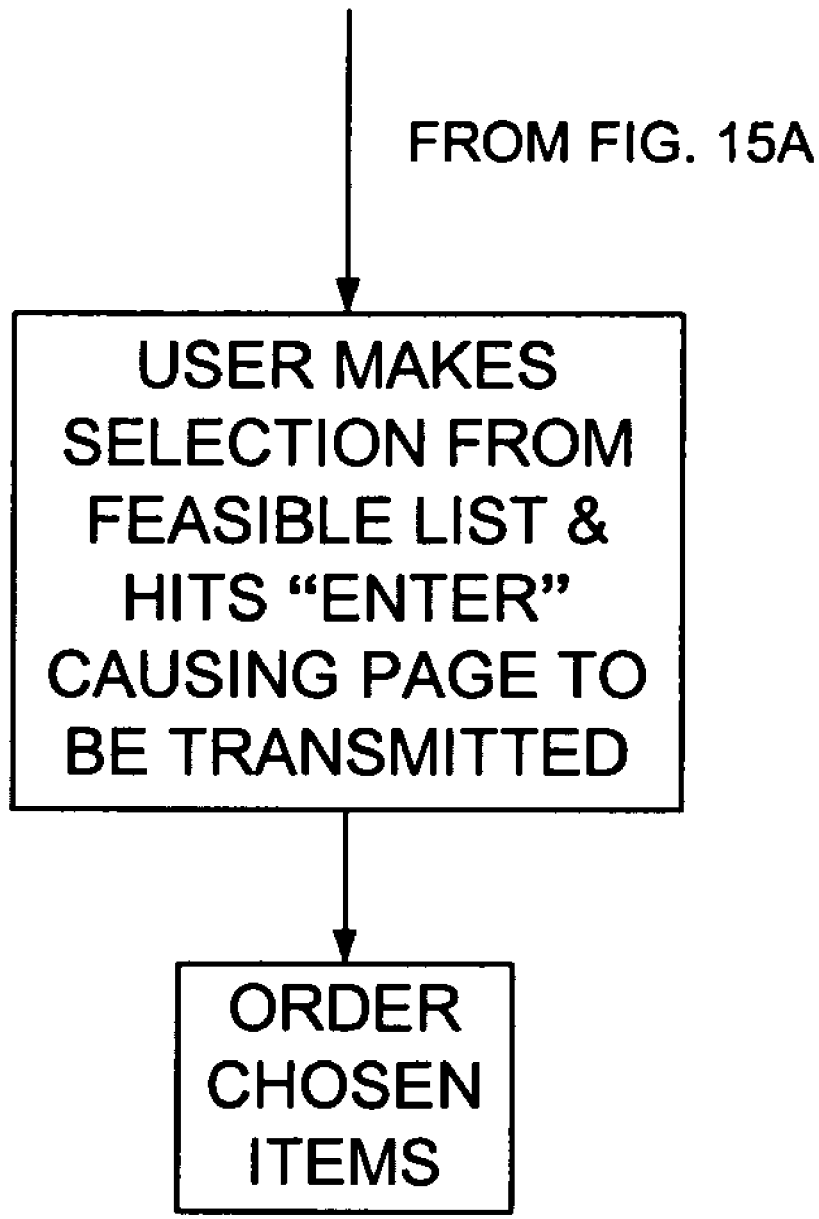
Figure 16A:
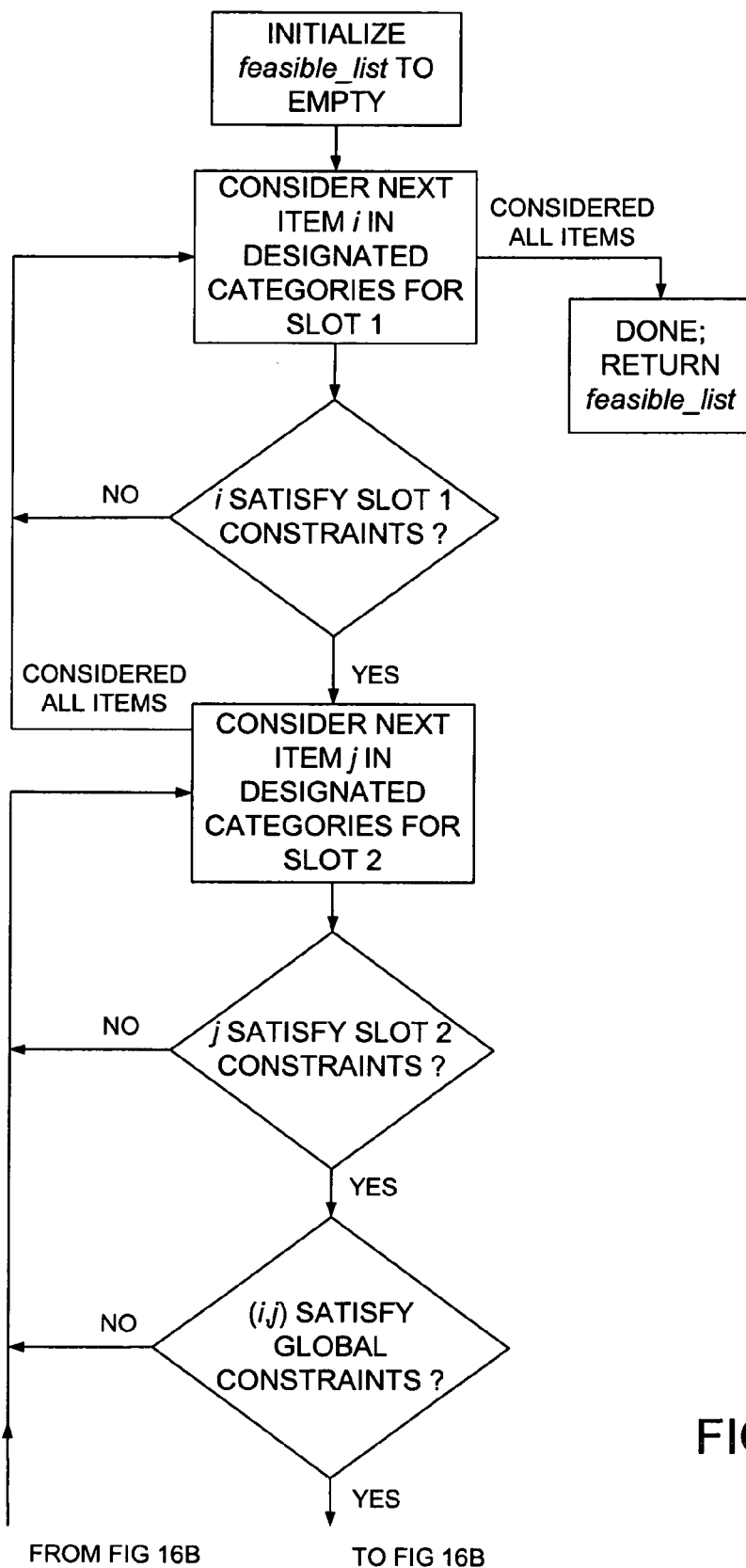
FIGS. 16A and 16B illustrate an example of how the system determines a substantially optimal purchase for two slots (items)
Figure 16B:
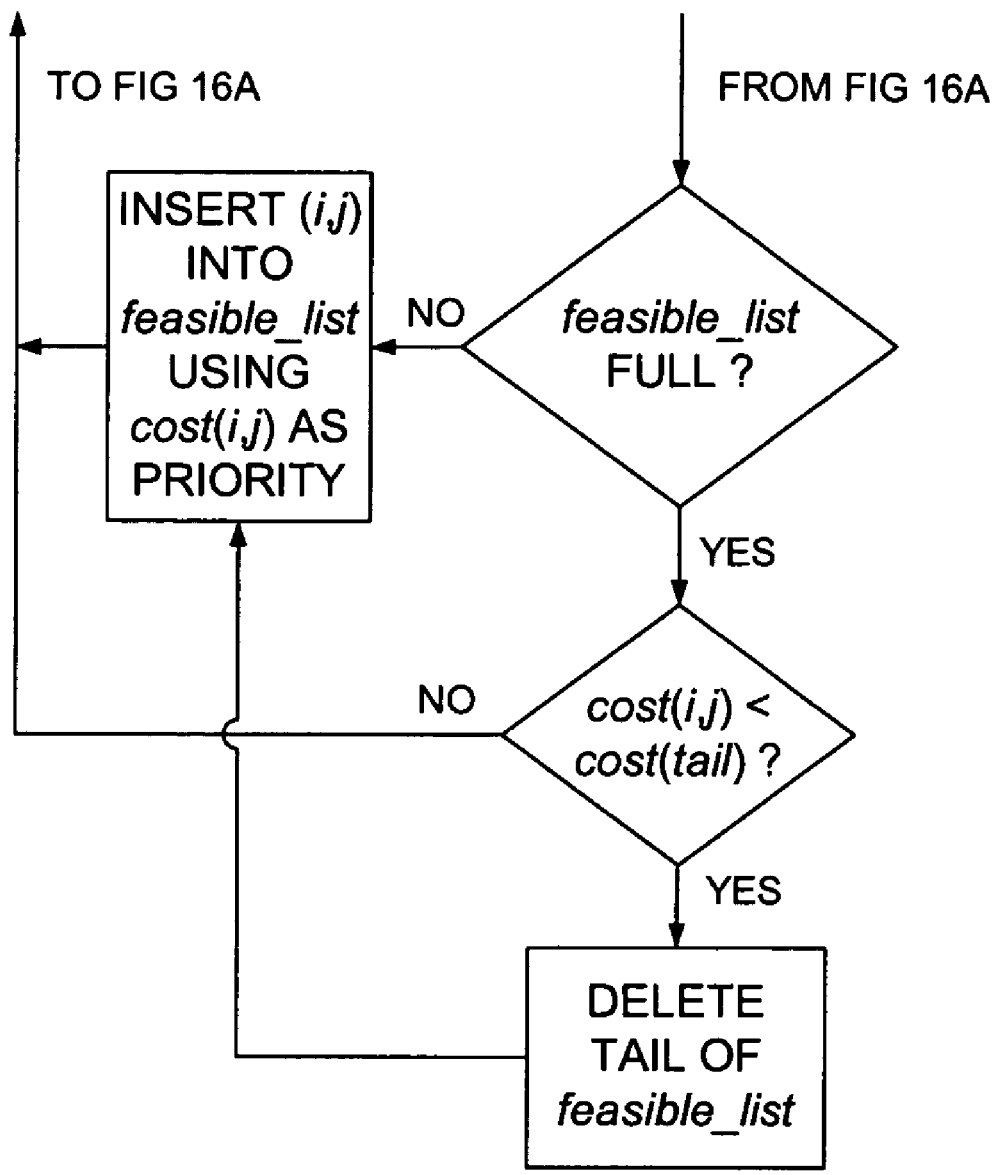

The process can iterate. The user, having been presented with substantially optimal purchase recommendations based on the specified constraints, may choose to partially accept the system's recommendations. Having done that, the user can, optionally, change some or all requirements and ask the system to recompute the substantially optimal purchases for the remaining ones. Referring to the example cited above of a user wishing to purchase gifts for three friends, he/she may elect to accept the system's recommendation for gifts for one or two friends, for example, and then, optionally, change some or all requirements and ask the system to recompute optimal purchases for the remaining friend(s). See FIGS. 15A, 15B, 16A, 16B, and 16C. FIGS. 15A and 15B describe interaction with the user. It should noted that the list of feasible items is provided to the user. The user is also provided with pull-down menus from which he/she can cycle through the available items and make selections if the system's choice is not to his/her liking. FIGS. 16A and 16B show an example of how the system determines a substantially optimal purchase for two slots (items). FIG. 16C provide pseudocode of the two-slot example shown in FIGS. 16A and B.

Figure 17A:
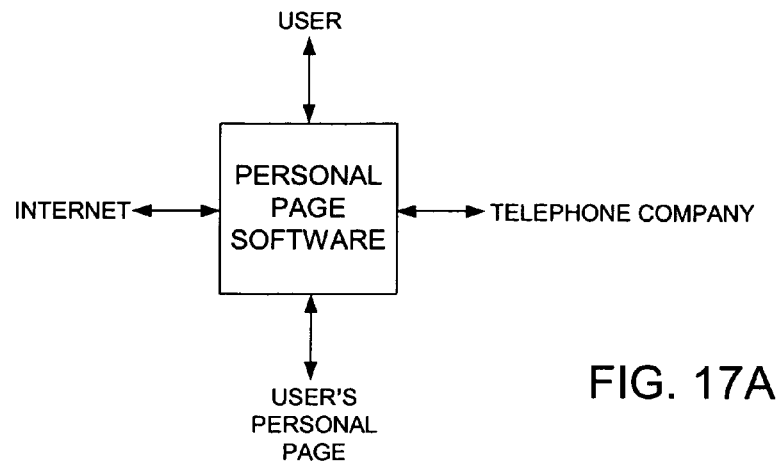
FIG. 17A illustrates the relationship between the personal page, the user, the Internet, and the telephone company.

Another application of the personal page involves programmable personalized telephone service. Preferably, this feature involves telephone company (and/or cellular telephone company and/or cable company, but for simplicity referred to here as "telephone company") interaction with the user's Internet personal page. (In other embodiments, the telephone company does not electronically interact with the user's page, but instead electronically accesses the user's telephone or cellular phone.) This feature allows the user to customize his phone service by programming telephone features on his/her personal page. The customization can be changed by the user by simply calling up the personal page and reprogramming or modifying the service logic. Programming, reprogramming, or modifying service logic is preferably done by accessing the Internet personal page using interactive means, but can also be done using voice input and voice recognition techniques as are known in the art. Preferably, the service logic is communicated to the personal page using a high level scripting language that is as close to natural language as possible, but lower-level interfaces, ones involving prompts and/or electronic forms that the user completes, are also possible in addition to or in place of higher level ones. Graphical languages as are known in the art for specifying service logic are also possible. Graphical methods, including but not limited to GUI techniques, may also be used. In general, all means of interacting with the personal page as known in the art can be used to program, reprogram, or modify the service logic contained there. A user can have many service logic scripts if he/she wishes, and they can be stored in service script libraries. Techniques of Artificial Intelligence as known in the art can be used to automatically construct service logic programs by monitoring the user as he/she interacts with the telephone over a period of time and "learning" the user's preferences. FIG. 17A shows the relationship between the personal page, the user, the Internet, and the telephone company.

The user's service logic specifies how he/she wishes telephone service to be governed. The user may, for example, specify that between the hours of midnight and 8 am all incoming calls are to be routed to another number, or certain incoming calls (based on the caller ID, for example) are to be blocked, or that the user wishes a wake-up call in 2 hours or at a certain hour. Similarly, the user can, for example, provide different outgoing messages based on the caller ID or class of caller ID's, or different outgoing messages for different time periods. For example, the user may have one message for all callers outside his local area, another one for specific caller ID's, another one for all caller's calling from a specific area code, etc. Call waiting features can be customized, with the user specifying which callers (based on caller ID, for example) he/she is willing to be interrupted for. The user can even elect to assign priorities to caller ID's, and specify in the service logic how to handle the situation of receiving a call from a caller of priority i while talking to a caller of priority j. (For example, "IF j<i THEN allow interruption ELSE play outgoing message 3.") The user may also, for example, choose to use different long distance carriers during different time periods (weekday, night, weekend for example) to take advantage of the best price available at the time a call is made. In this case, the user's local computer's memory and/or the user's Internet browser and/or personal page may have access to long distance carrier rates available on the Internet and can interface to service logic programming tools so that the best strategy for deciding which carrier to use during a particular period can be at least partially automated by the software. Optimization techniques known in the art for creating an optimal long distance carrier schedule (which carrier to use during which periods) can be used in constructing the service logic. In general, all techniques known in the art for specifying and generating telephone service can be used.

Figure 17B:
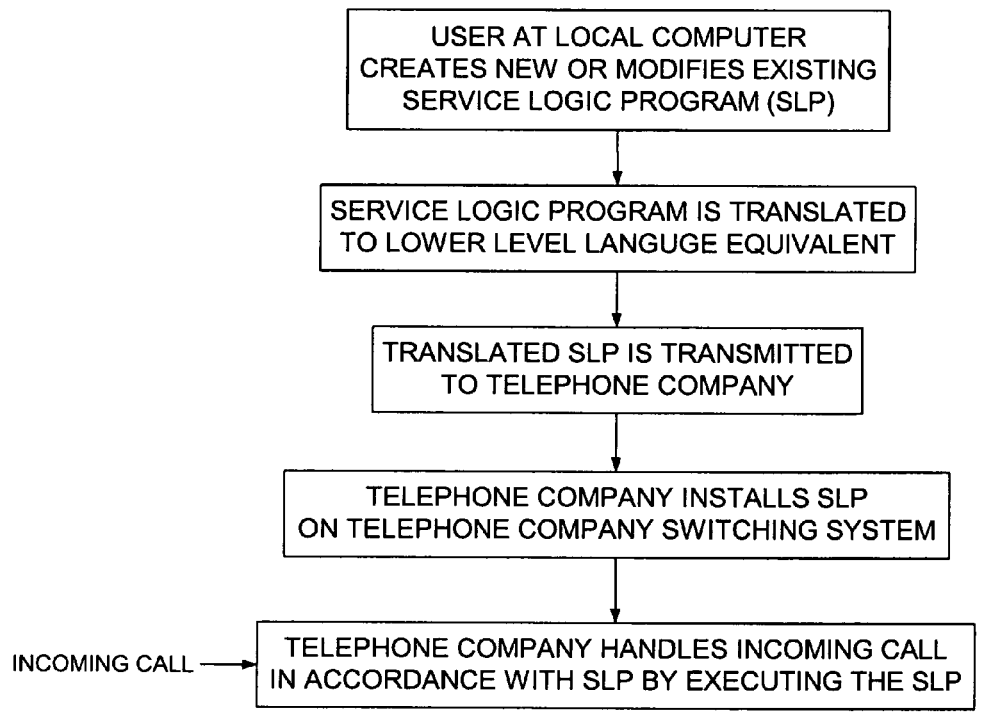
FIG. 17B illustrates the sequence of steps involved in creating and installing a service logic program (slp)

Whenever a user's service logic is programmed, reprogrammed, or modified on his/her personal page, the service logic is preferably downloaded to the telephone company's computer. This is preferably done using Internet communication and Internet communication protocols between the two computers, but can be through direct connection or through wireless transmission instead. In general, any and all means known in the art for communicating between computers can be used. Preferably, the service logic is translated to a lower level language equivalent so that its execution is as efficient as possible. Once the service logic is resident in the telephone company's computer, the logic is invoked whenever certain triggering events occur, such as, for example, the arrival of an incoming call, reaching a certain moment in time, going off-hook, going on-hook, etc. The user's service is handled appropriately in accordance with the dictates of the programmed service logic. FIG. 17B illustrates the sequence of steps involved in creating and installing a service logic program (slp).

In an alternative embodiment, the service logic is resident in a device (or devices) at the user's location, such as the user's telephone set, telephone answering machine, computer (personal computer, for example), cellular phone, beeper, pager, television set, other hand held appliance, etc. The service logic executes locally, in the device that it is resident in, and is triggered by events such as, for example, the arrival of an incoming call, reaching a certain moment in time, etc. Examples shown above of the various ways service can be programmed by the user apply here as well.

If the user's local computer (personal computer, for example) contains the service logic handling the user's telephone service, then the user's Internet browser and/or personal page can interface to the service logic. In this fashion, the service logic can be kept up-to-date to adjust to changing circumstances. For example, the user's Internet browser and/or personal page can periodically download the latest long distance carrier rates and store them on the user's local computer so that the service logic can make its decisions based on the most recent data. In general, the service logic can use a locally stored database to aid it in its real-time execution decisions, and that database can be kept up-to-date automatically by the user's Internet browser and/or personal page. (For example, if personal page software detects over the Internet that one of the user's acquaintance's has just been elected to high office, then the software can upgrade the acquaintance's priority, as discussed above.) In some embodiments, the actual service logic itself can be modified by the Internet browser and/or personal page. For example, if the user is using a service logic program obtained from an outside source, over the Internet say, and the personal page has detected that an upgrade to the service logic program is now available, the personal page software can download the upgrade and apply it to the service logic program. Any and all techniques known in the art for automated management of software upgrades, preferably over the Internet, can be used to maintain service logic programs.

The user can also, in some embodiments, use buying request scripts described above to locate new service logic programs. The user creates a script such as, for example, the following on his personal page:

PURCHASE telephone service logic program WITH personalized outgoing message feature AND priority user feature<$25.

Then when the buying request has found/purchased a new service logic program using the technique described above, software can automatically download it and install it on the user's computer.

Figure 18:
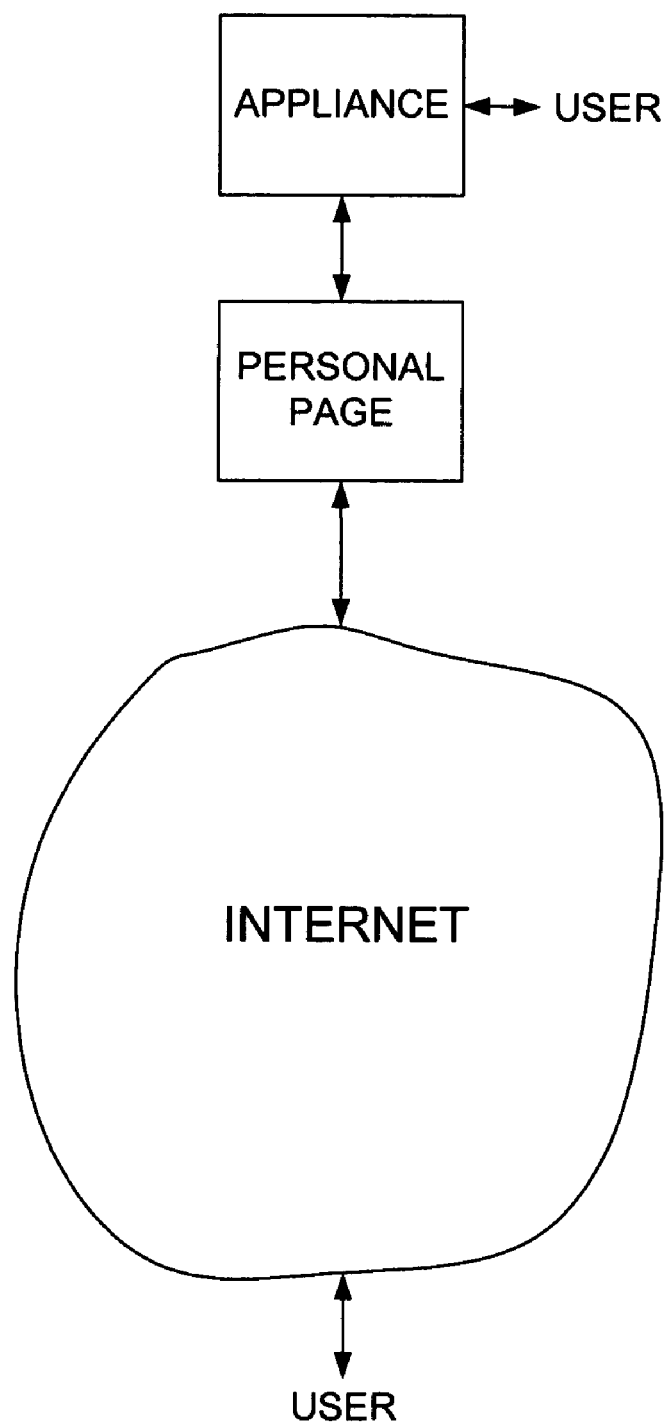
FIG. 18 illustrates an appliance interfaced to the personal page.

This technique of creating a buying request script on the user's personal page, which then locates a service logic program, preferably on the Internet, downloads it, and then installs it locally on the user's computer can be used to locate, download, and install other types of software and/or data as well, not only telephone service logic programs. For any appliance that contains software and/or data, such as, for example, a telephone, television, video camera, CD player, calculator, clock, electronic organizer, camera, automobile or other vehicle, microwave oven, washing machine, stove, medical machine, dental machine, automobile diagnostic machine, factory machine, farm machine, military weapon or machine, telephone switching system, etc., and that is connected to the user's computer (through wire or wireless means), a buying request script located preferably on the user's personal page can be used to locate, download, and install software and/or data on that appliance. In this case, the user's computer installs the downloaded software and/or data on the appliance preferably through the communication medium (wire of wireless) linking it to the appliance. The appliance need not be necessarily permanently connected to the user's computer to use the method just described. See FIG. 18.

In other embodiments the appliance can be connected to the Internet directly, preferably through its own computer. In some embodiments the appliance can have it's own personal page. Appliances that are connected to the Internet, whether directly or through a user's computer, can be interacted with and controlled from elsewhere on the Internet. For example, if the appliance is a video camera (or collection of video cameras) in a house that is connected to the Internet, then the home owner on vacation, for example, in another location can connect to the Internet locally and access the camera's Internet page (preferably its personal page) and view real-time images of the interior of his house to see that everything is in order. He/she can, in some embodiments, control the camera (s) and reposition it (them), thereby improving the view, zooming in on a particular portion of a room, for example. The camera(s) may be on the exterior of his house as well. Other appliances, such as a stove, microwave oven, water heater, furnace, office machine, factory machine, etc., can be similarly remotely controlled if connected to the Internet. Thus, for example, a user on his/her way home from work can connect to the Internet through a wireless communication device as is known in the art, visit the Web page associated with his/her coffee machine at home, and issue a remote command that switches the machine on so that fresh coffee will be ready when he/she arrives home. The user can, in some embodiments, reprogram the appliance remotely through the Internet linking him/her to the appliance. This is preferably done by the user visiting his/her personal page, creating a purchase script (B.R.) as described above to locate an appropriate program for the appliance. Once found, the script downloads the appliance program to the appliance itself through the appliance's Internet connection (or through the user's computer to which the appliance is connected) for installation at the appliance.

Utility companies can use the technique just described to gain access to their meter devices remotely. The meter devices can be connected to the Internet and accessed by the utility company through the Internet for the purpose of taking readings, making adjustments, turning offservice, etc. Similarly, banks and financial institutions can connect their financial machines, ATM's for example, to the Internet and then remotely control and monitor them from central locations. In general, any electrical or electronic device for which remote monitoring and/or control is desired can be connected to the Internet and, preferably, be provided with a personal page, and thereby accessed remotely by authorized personnel. Password protection and/or encryption techniques as known in the art can be used to protect the integrity of such systems.

The user creating a buyer request script can, in some embodiments, send his/her buying request script out to the Internet in search of other, similar buying request scripts. The buying request script then "joins" together with other scripts to form collective buying groups, hoping to get a better deal by combining with other purchases into a single, larger purchase. Preferably, this is done as follows. The user creates a buyer request script as described above, which is then sent to an aggregation site on the Internet where the combining with similar scripts, if it is to occur, takes place. Software at the aggregation site scans and analyzes the scripts that have been sent there and, preferably, using Artificial Intelligence techniques identifies scripts that are compatible and that can be combined. The software then creates a "super" buying script from the aggregated ones that represents the combined purchase, once again preferably using Artificial Intelligence techniques. In alternative embodiments, the combining is not done at a central aggregation site, but instead software aggregation agents roaming the Internet and visiting users' personal pages locate and pool compatible scripts from which super scripts are created. Preferably, super scripts belong to virtual users, "super" users, which are software entities that represent the combined interests of the real users whose scripts have been combined. The super scripts then act like ordinary user scripts as described above. Once a super script finds a matching vendor script and the deal is closed, the aggregation software splits the purchase among the aggregated buyer request scripts and preferably sends electronic notification to the users whose scripts were combined notifying them that a match has been found. Vendor scripts can be combined in a similar way in some embodiments. In some embodiments, super scripts themselves can be combined to form "super super scripts," and so on.

Personal pages can also be used to support online "Requests For Proposals," (RFP's). The user wishing to solicit proposals creates an RFP, preferably using a high-level scripting language as described above, and puts it on his/her personal page. In other embodiments, it can be created by completing an electronic form. Alternatively, the RFP can be generated using voice input and/or graphical techniques, or any other technique known in the art for collecting data from users. Once on the personal page, the system uses the techniques for finding suitable matches for a user's bidding requirement described above to find appropriate proposals that are compatible with the RFP. Proposals play the role of vendor scripts described above. In the preferred embodiment, the RFP stays resident on the personal page while roaming vendor software agents traverse the Internet visiting personal pages looking for RFP's. A vendor software agent that locates a compatible RFP then submits an electronic proposal to the user, preferably by submitting it to the user's personal page. In other embodiments, RFP's roam the Internet and visit selected sites where they encounter vendors' software agents. In other embodiments, the RFP's and vendor agents are sent to central sites where the matching takes place. In yet other embodiments, the continuously circulating marketplace technique described below can be used. In general, any technique known in the art for rendezvousing software and/or data entities in a network can be used.

In the preferred embodiment, a central historical archive of RFP's and the proposals submitted in response to them is maintained on the Internet. (In other embodiments, the historical archive is not stored centrally, but is distributed across the network, and may even be stored locally on users' computers. They may even be contained on users' personal pages.) On creating an RFP, the user can, optionally, query the historical archive, retrieving similar RFP's along with the proposals submitted to them. The user can then use these retrieved proposals and contact the vendors that submitted them to solicit proposals for his/her RFP. In the preferred embodiment, the query, retrieval, and contacting of vendors for the solicitation of proposals is done automatically by software agents connected with the user's personal page. All techniques known in the art for gauging the similarity of scripts can be used to determine if two RFP's are similar, including but not limited to the compatibility dictionary technique described above.

Returning to B.R.'s and vendor scripts, in an alternative embodiment, the bidding, purchasing, and matching can be done at a network site or multiple sites, called here the "marketplace," which is neither the user's local computer nor the vendor's site. The marketplace acts as an electronic market matcher, matching vendors and users. The marketplace dynamically maintains a database of pending users' purchase requests (B.R.'s). Preferably, this database is segmented along item categories so that matching vendors and users can be done efficiently and quickly. Vendor electronic representatives are also transmitted to the marketplace.

The marketplace interprets (i.e., executes) each vendor script against each purchase request in the appropriate category (or categories) of the database. When a match is found, the marketplace may electronically enable the vendor's electronic software representative to contact the user. This is similar to the feature on dating/matchmaking sites where the user can ask the system to notify him/her when a suitable candidate registers with the site. Alternatively, the marketplace sends electronic messages to the matched user and vendor indicating that they have been matched. Also, vendor scripts can have trigger features, which ask the marketplace to store the script indefinitely or for a limited period of time and to enable the script (or the vendor) when a matching user request is sent to the marketplace. Similarly, the user request can be stored in the marketplace indefinitely or for a limited period of time, on command from the user, and can have triggering features.

Figure 21:
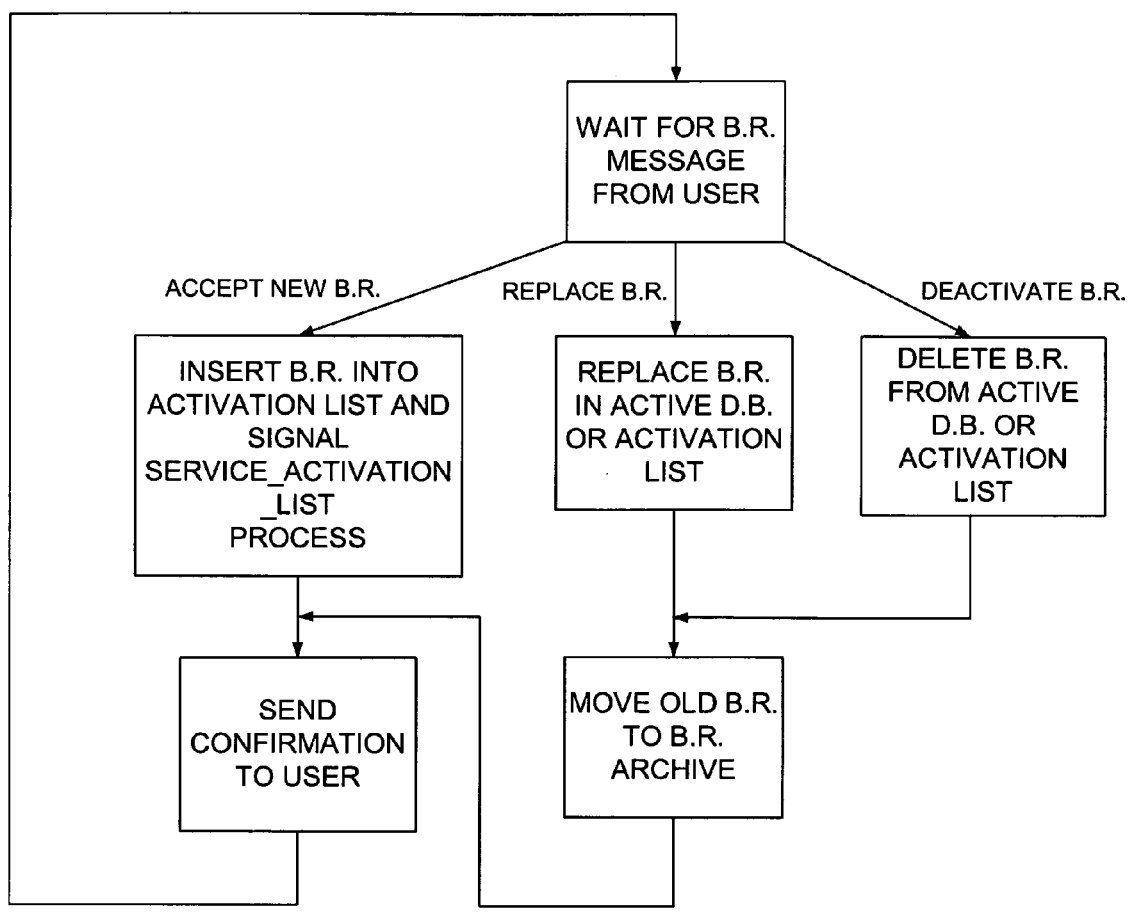
FIG. 21 illustrates processing purchasing requirements in accordance with user input.
Figure 22:
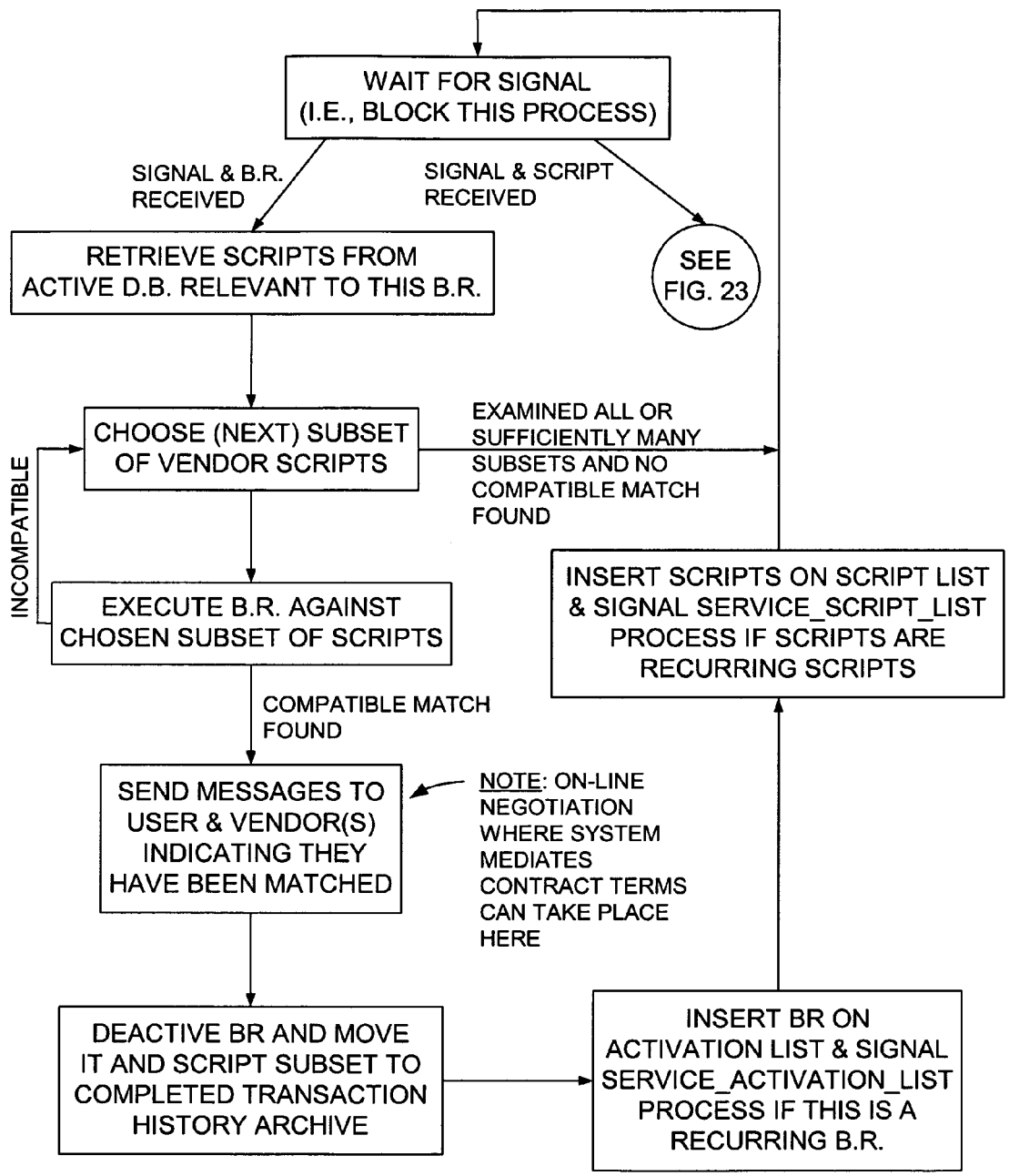
FIG. 22 illustrates matching B.R.'s and vendor scripts when a B.R. is received.
Figure 23:
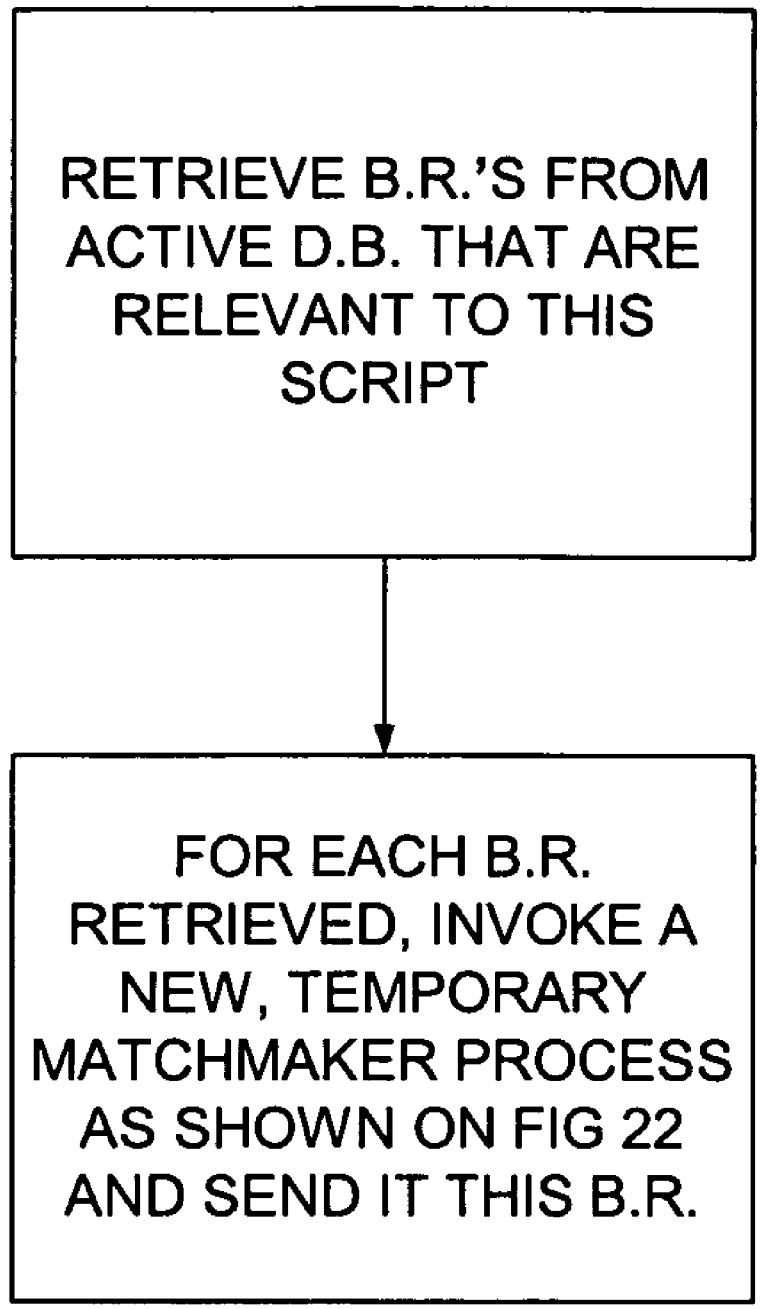
FIG. 23 illustrates matching B.R.'s and vendor scripts when a vendor script is received.
Figure 24:
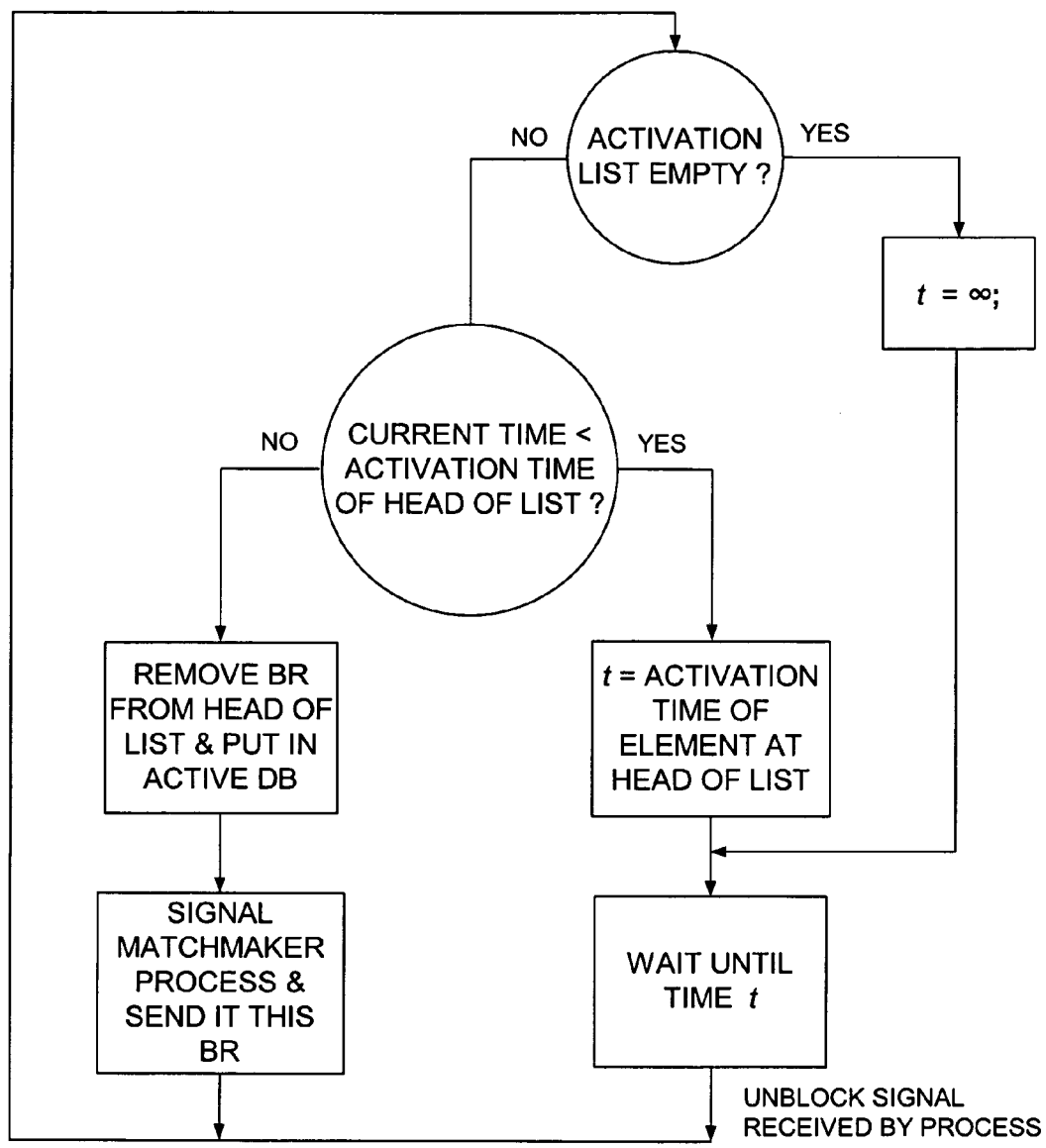
FIG. 24 illustrates a method for managing the B.R. activation list.

FIGS. 20–24 provide further implementation details of this alternative embodiment. FIG. 20 shows computer processes that are concurrently executed to match purchasing requirements and vendor scripts. Preferably, these processes are synchronized using wait and signal primitives. FIG. 21 illustrates the process of processing purchasing requirements in accordance with user input. Unfulfilled purchases can remain in the system on its activation list. The processing of vendor scripts is performed in a similar manner. (See FIG. 21.) The matching of purchasing requests and vendor scripts is illustrated in FIGS. 22 and 23. The matching techniques described above may be used for this purpose. FIG. 24 shows a method for managing the purchasing requests (BR's) activation list. A similar process can be used to manage the vendor script activation list.

An alternate implementation that enables various entities to conduct electronic transactions in a distributed environment is based on the object-oriented computation model. In this implementation, active intelligent software "agents" (objects) are instantiated by users, each agent the carrier of a purchasing requirement and bidding rule throughout the network. The agents represent the user in his/her quest to make purchases. We will call these agents "purchasing agents." Similarly, vendors instantiate intelligent software agents that carry scripts throughout the network. We will call these agents "vendor script agents." All agents can remain anonymous if their owners wish to remain anonymous.

On instantiation, a purchasing agent is released into the Internet, migrating to sites at which it will meet vendor script agents. On finding one another, the bidding rule agent and vendor script agent invoke methods (functions) within each other to determine if they are a compatible match. When a match is found, both agents report back to their owners (the user and the vendor) that a match has been found, and the deal can then be closed between the user and the vendor. The agents can then be destroyed as the deal is concluded.

The purchasing agents can be relatively passive compared with the vendor script agents. The purchasing agents can migrate to a marketplace site and passively wait for vendor script agents to "fly by" and visit them.

Yet another implementation is possible, this one based on a continually circulating marketplace. Here, all information on a global basis, or perhaps on an industry basis, is constantly and continually circulating throughout the Internet. All bidding rules and all vendor scripts are continuously being broadcast and rebroadcast to every server (or perhaps to every local computer) on the Internet. Alternatively, there can be two separate broadcast streams, one for purchasing requests and one for vendor scripts. Alternatively, only purchasing requests are broadcast. Alternatively, only vendor scripts are broadcast. So a user wishing to make a purchase inserts his purchasing request into the broadcast stream. Similarly, a vendor with goods and/or services to offer inserts his script into the circulating stream. A user with a purchase to make writes a request that "pulls down" (i.e. filters) from the circulating stream of scripts those scripts relevant to his purchase request. Similarly, or perhaps alternatively, the vendor wishing to sell goods and/or services writes a script that pulls down from the circulating stream of purchasing requests those requests that are relevant to what the vendor is marketing. The pulled down scripts (or purchasing requests) can then be examined by the user (or vendor) for a match. In general, any technique known in the art for rendezvousing software and/or data entities in a network can be used.

A continually circulating steam of information is a generally useful technique that applies beyond the confines of the application just described. An entire network, such as the Internet, for example, can be implemented using this technique. Preferably connected through high speed cable or, in other embodiments, through wireless microwave communication or through satellite transmissions, the entire information contained in the network is continually circulated to each user's local computer. Preferably, the information is grouped into page-like units, similar to the technique used in the Internet today where information is organized into Web pages. The user wishing to access information in the network composes a software filter that executes on his/her local computer and extracts from the circulating stream those pages containing information he/she is interested in. For example, if the user wishes to see all pages containing the phrase "American democracy," then he/she composes a filter in an appropriate scripting language indicating that only those pages containing the desired phrase are to be extracted. Alternatively, he/she completes an electronic form similar to the way Internet search engines operate and inserts the phrase "American democracy" into an appropriate field on the form, or uses voice input techniques as are known in the art. In general, any technique known in the art for collecting information from a user can be used. The user's local computer then extracts from the circulating stream the desired pages for presentation to the user. Alternatively, the continually circulating stream of information may not be broadcast to each user's local computer, but instead may be broadcast to computers to which user's local computer's are connected, e.g., servers. In such embodiments, the user composes filters that are sent to the server and execute there on the user's behalf. The extracted data is then sent by the server to the user's local computer. Should a user wish to communicate information from his/her local computer to another computer located on the network, the user inserts the information into the circulating stream with an electronic address indicating the destination. Alternatively, if the user's local computer does not have the circulating stream sent directly to it, but instead is connected to a server to which the stream is broadcast, then the user sends the information to the server for insertion into the circulating stream. All inter-computer communication (e.g., email, Instant Messages, etc.) can be done using this technique. A message destined for another computer is preferably removed from the circulating stream by the receiving computer as it extracts the received message. Alternatively or in addition, the transmitting computer can remove the message from the stream after a certain amount of time has elapsed or after the message has circulated through the network a certain number of times. Alternatively or in addition, garbage collecting "scavenger" nodes that prune the information stream and remove old and/or expired messages and/or pages may be included in the network. In some embodiments, encryption techniques as are known in the art can be used to shield unauthorized access and/or manipulation of information from the stream. In some embodiments, the network may include "police" nodes that monitor the network for undesired and/or illegal data, e.g., pornography.

In some embodiments, the circulating stream of information may be composed of several circulating substreams, not all of which would be necessarily broadcast to every computer on the network. For example, there may be a sports substream, a science substream, a financial substream, etc. The substreams may not necessarily be disjoint, i.e., some information may appear in several substreams. For example, an article about grapes may circulate in a wine connoisseurs substream and in an agricultural substream.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. Doubtless numerous other embodiments can be conceived that would not depart from the teaching of the present invention whose scope is defined by the following claims.

We claim:

1. A computer-implemented method comprising:
storing at least one acquisition specification of a first user represented in a scripting language that specifies acquisition requirements;
parsing the acquisition specification into at least one purchase form comprising a plurality of attributes, at least one of which specifying a transactional action desired to be electronically completed by the first user;
receiving over the Internet and storing offering specification comprising at least one vendor form comprising a plurality of attributes, at least one of which specifying a transactional action desired to be electronically completed by a second user; and
electronically determining if the attributes in the purchase form are compatible with associated attributes in the vendor form by testing attributes in the purchase form against attributes in the vendor form for satisfiability using a compatibility dictionary, comprising a storage of sets of compatible terms associated with an automated completion of a transaction, wherein the step of testing comprises accessing the storage of the dictionary and determining whether the transactional action in the purchase form is compatible with the transactional action in the vendor form,
wherein the storing the at least one acquisition specification is on a personal page assigned to a user providing the acquisition specification and said personal page communicates with Global Positioning System.

2. The method of claim 1 wherein the at least one offering specification comprises data represented by a scripting languages.

3. The method of claim 1 wherein the offering specification is received at the location where the personal page with at least one acquisition specification is stored.

4. The method of claim 1 wherein the acquisition specification comprises data related to at least one advertisement.

5. The method of claim 1 wherein voice recognition software is associated with the personal page and the acquisition specification is provided using voice input.

6. The method of claim 1 wherein the acquisition specification is provided to the personal page using wireless communication.

* * * * *